United States Patent [19]
Itoh et al.

[11] Patent Number: 5,526,078
[45] Date of Patent: Jun. 11, 1996

[54] APPARATUS FOR RECORDING CAMERA INFORMATION CAPABLE OF OPTICAL DATA RECORDING AND MAGNETIC DATA RECORDING

[75] Inventors: Junichi Itoh; Keiji Kunishige, both of Hachioji; Koji Mizobuchi, Sagamihara; Yoshiaki Kobayashi, Hachioji; Toshiaki Ishimaru, Hino; Akira Watanabe, Akikawa; Yasunobu Otsuka, Hino, all of Japan

[73] Assignee: Olympus Optical Co., Ltd., Tokyo, Japan

[21] Appl. No.: 209,761

[22] Filed: Mar. 11, 1994

[30] Foreign Application Priority Data

Mar. 15, 1993 [JP] Japan .................................. 5-054365

[51] Int. Cl.⁶ .................................................. G03B 17/24
[52] U.S. Cl. .................................................. 354/106
[58] Field of Search .................................. 354/105, 106, 354/107, 108, 109

[56] References Cited

U.S. PATENT DOCUMENTS 5,148,197  9/1992  Kunishige .............................. 354/106
5,220,368  6/1993  Kikukawa et al. ..................... 354/106

FOREIGN PATENT DOCUMENTS 4-125533  4/1992  Japan .

Primary Examiner—Howard B. Blankenship
Attorney, Agent, or Firm—Kenyon & Kenyon

[57] ABSTRACT

An apparatus for recording data to a film, executing: both unchangeable recording such as optical recording, and changeable recording such as magnetic recording for relatively important data, which is required protection from data failure and is permitted to change such as date, date print mode, and trimming direction of printing area, and executing: only magnetic recording for relatively unimportant data, which is allowed some data failure and has few possibility of changing such as aperture value, shutter time value, photometric value, exposure compensation value, and object distance value; wherein the apparatus is housed in a detachable back cover of a camera, and data being transmitted from the main body of the camera to the back cover.

4 Claims, 30 Drawing Sheets

| DATA | bit | 3 | 2 | 1 | 0 | |
|---|---|---|---|---|---|---|
| DATE | YEAR | 0 | 0 | 0 | 1 | ⎫⎬⎭ 1992 |
| | | 1 | 0 | 0 | 1 | |
| | | 1 | 0 | 0 | 1 | |
| | | 1 | 0 | 0 | 2 | |
| | MONTH | 0 | 0 | 0 | 0 | ⎫⎬⎭ MARCH |
| | | 0 | 0 | 1 | 1 | |
| | DAY | 0 | 0 | 0 | 1 | ⎫⎬⎭ 15 |
| | | 0 | 1 | 0 | 1 | |
| TIME | HOUR | 0 | 0 | 1 | 0 | ⎫⎬⎭ 23 |
| | | 0 | 0 | 1 | 1 | |
| | MINUTE | 0 | 1 | 0 | 1 | ⎫⎬⎭ 55 |
| | | 0 | 1 | 0 | 1 | |
| PRINT MODE | | X | X | X | X | |
| TRIM | | X | X | X | X | |
| NUMBER OF FRAME | | 0 | 0 | 0 | 1 | ⎫⎬⎭ 15EXP |
| | | 0 | 1 | 0 | 1 | |

FIG. 37

APPARATUS FOR RECORDING CAMERA INFORMATION CAPABLE OF OPTICAL DATA RECORDING AND MAGNETIC DATA RECORDING

FIELD OF THE INVENTION

The present invention relates generally to an apparatus for recording information and, in particular, to an apparatus for recording information in a camera which is capable of recording data on film, wherein the information to be recorded is information such as the photographing date or the trimming area direction, of the printing area with reference to the full-sized exposure area of the film, and so on.

BACKGROUND OF THE INVENTION

A method of recording information such as the date a photograph is taken or film trimming area directions onto the film are known. When recording such information on the film, there are provided two methods consisting of a method which is not capable of changing data after developing the film such as an optical printing, and a method which is capable of changing data at any time such as a magnetic recording. When recording data on the film, usually, only one of the above mentioned methods is applied.

Recently, a method of recording such information using both of the above mentioned methods was disclosed in the Japanese laid open patent publication 4-125533/92, which discloses a camera capable of recording direction data of trimming using both magnetic recording and optical recording so as to provide visual data verification not available from the magnetic recorded data. However, in this prior art, the idea of selecting data suitable for recording on the film, as a function of the properties of magnetic recording and optical recording and the importance of the data is not shown. Thus, while the prior art recognizes that data to be recorded to the film includes the date of photographing, mode of date printing, aperture value, shutter time value, photometric value, exposure compensation value, distance data of an object, and so on, it does not disclose a method of selecting which recording method should be used to record such data to the film.

SUMMARY OF THE INVENTION

A first object of the present invention is to obtain an apparatus for recording information which is capable of selecting recording methods in accordance with the importance of the data to be recorded, A second object of the present invention is to obtain an information recording apparatus which is capable of selecting recording methods in accordance with the data which may be changed, or with the data which will not be changed, after taking photograph.

A third object of the Present invention is to obtain an apparatus for recording information of a camera which is capable of selecting recording methods on the basis of whether the data is permitted to be changed, or the data is not permitted to be changed, after taking photograph.

In order to obtain such an apparatus, according to the present invention, the apparatus for recording information of the camera, comprising: a memory means for storing a plurality of data for every frame to be used when taking photographs, developing, or printing; a printing means for printing the data on the film; a magnetic recording means for recording the data magnetically onto the magnetic recording portion of the film; and a control means for recording data stored in the memory by using both magnetic and optical recording methods for first data which are highly protected from changing, and/or may be changed, and for recording data stored in the memory by using only magnetic recording methods for second data which are not highly protected from changing, and/or may not be changed.

These and other objects and features of the present invention will be better understood by reading the description of the preferred embodiments as given below.

BRIEF DESCRIPTION OF THE DRAWINGS

The present invention will be more apparent from the following detailed description, when taken in conjunction with the accompanying drawings, in which;

FIG. 37 is an illustration showing an example of data printed into the area A in FIG. 34(a)

DETAILED DESCRIPTION

Preferred embodiments of the present invention will be explained below with reference to the accompanying drawings.

Figure 2:
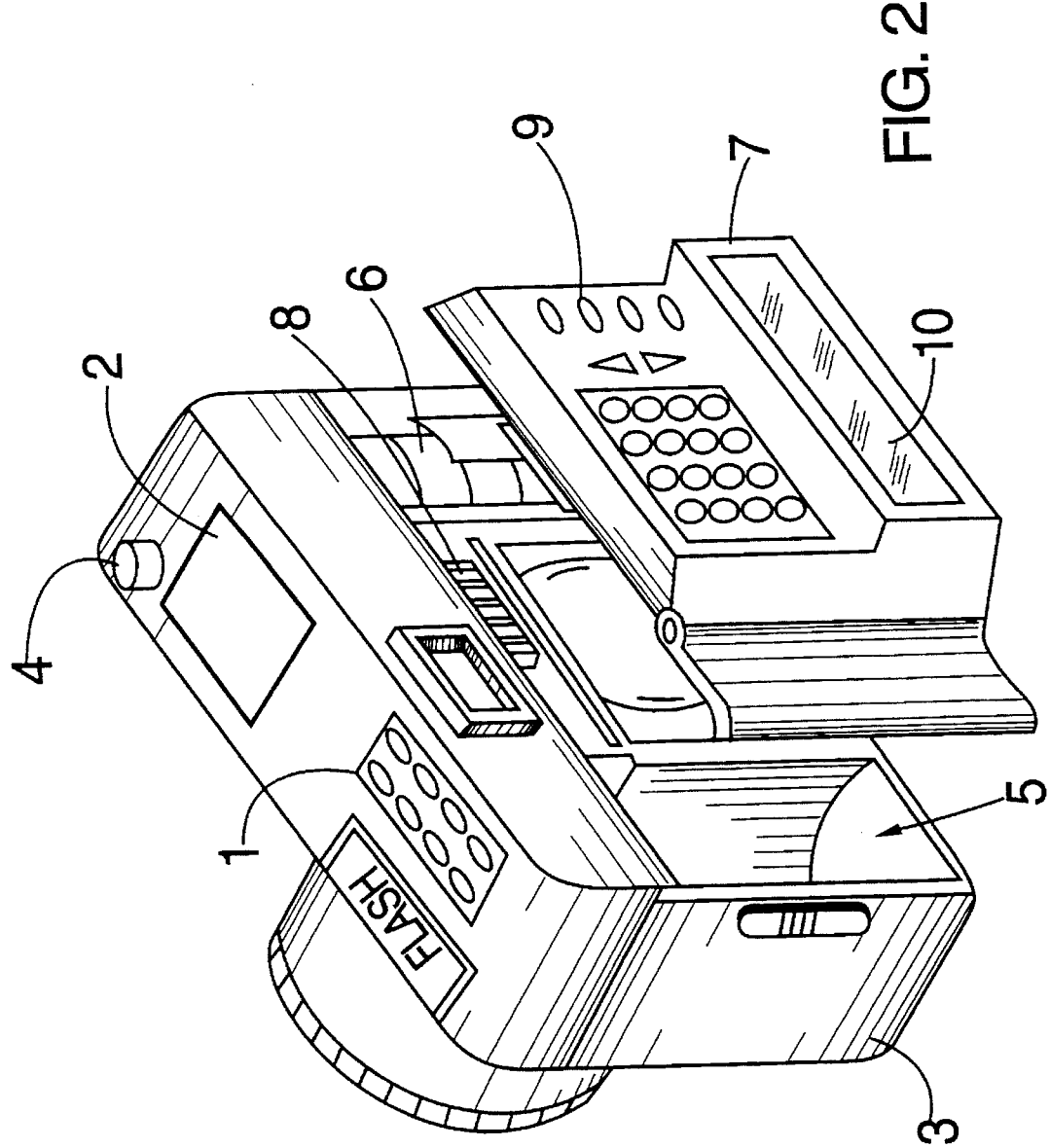
FIG. 2 is a drawing illustrating the outside of a camera system incorporating an information recording apparatus according to the present invention.

FIG. 2 is an illustration showing an outside drawing of a system incorporating an information recording apparatus according to the present invention. There are provided with mode switch MODE SW 1, information display 2, and release switch REL SW 4 on the upper face of a main body of a camera 3, and provided with film cassette housing 5 in the back face of the camera for housing a film cassette, take up spool 6 for winding up loaded film, and connecter 8 for making communication with a back cover module 7 housed in a back cover. The back cover module 7 is detachable from the main body 3 of the camera, various operation switches 9 for data recording, and display member 10 for indicating camera data on the module 7. The MODE SW 1 is operated to set the operating mode of the camera, where the operating mode is indicated in the display 2. The back cover module 7 is connected to the main body 3 of the camera through the connecter 8, executing data recording operation such as date printing or magnetic writing onto the film in response to the main body 3 of the camera.

Figure 1:
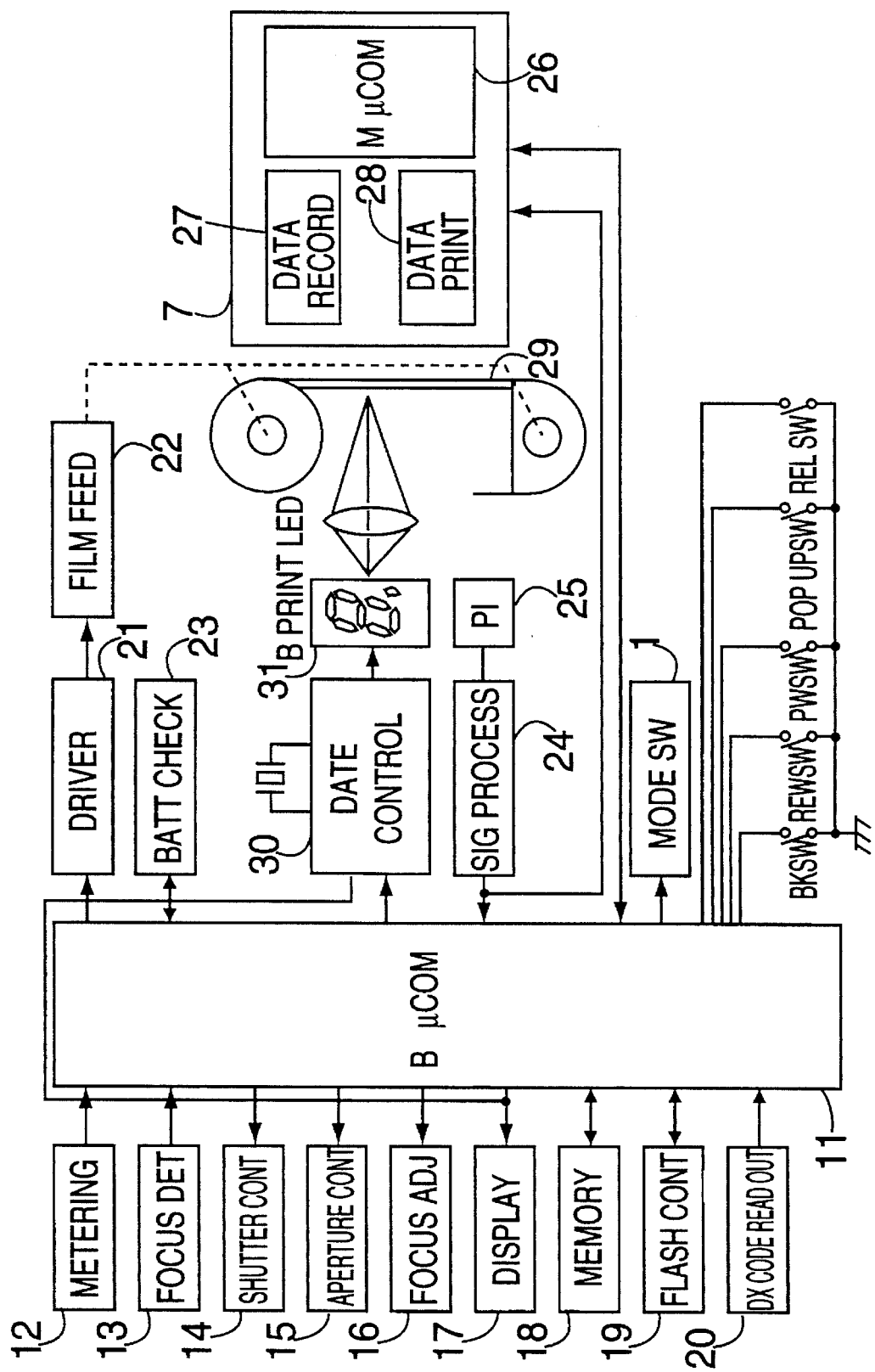
FIG. 1 is a block diagram showing a structure of an information recording apparatus according to an embodiment of the present invention.

FIG. 1 is a block diagram showing a structure of the information recording apparatus according to one-embodiment of the present invention. A microcomputer for body use 11 (hereinafter referred to as "B microcomputer") housed in the main body 3 of the camera controls the main body 3 of the camera. Where a light metering circuit 12, a focus state detecting circuit 13, a shutter controlling mechanism 14, an aperture controlling circuit 15, a focus adjusting mechanism 16, an indicating circuit 17, a memory circuit 18, a flash control circuit 19, a read out circuit of the DX code 20, a driver circuit 21, a battery check circuit 23, a date control circuit 30, a signal processing circuit 24, and mode switches 1 are housed in the main body 3 of the camera. A microcomputer (hereinafter referred to as "M microcomputer") for the back cover module use 26, a data recording circuit 27, and a data printing circuit 28 are housed in the back cover module 7. A driver circuit 21 is connected to a film feeding mechanism 22, a date control circuit 30 is connected to a body B printing LED 31, and a signal processing circuit 24 is connected to a photo interrupter PI 25, respectively.

A display indicating circuit 17 indicates current frame number and exposure condition in response to the B microcomputer 11. The memory circuit 18 is composed by a non-volatile memory such as an EEPROM, which stores current frame number and adjusting data of the camera. The flash control circuit 19 controls charging of the main capacitor (not shown) of a flash device, and triggering a Xenon tube in response to the B microcomputer 11. The read out circuit of the DX code 20 reads out film speed and the frame number of the exposure from the film cassette. The driver circuit 21 controls a motor for driving the film feeding mechanism 22 in order to wind and to rewind the film 29 in response to the B microcomputer 11. The battery check circuit 23 is used when measuring battery voltage of the main body 3 of the camera. The B printing LED 31 prints date optically within the exposure area of the film, where date printing is executed in response to winding operation after taking a photograph in response to the date control circuit 30.

The date control circuit 30 produces printing data such as "minute", "hour", "day", "month", and "year" by dividing the clock frequency generated by a quartz controlled oscillator, wherein the date data are indicated by the display circuit 17. The signal processing circuit 24 converts a signal generated by the PI 25 in response to the movement of the film 29 into pulse signals. The mode switches 1 are switches to be operated when changing operating mode of the camera. A back cover switch BK SW is a switch which is closed when the rear cover of the camera is opened. The B microcomputer 11 decides film loading by detecting transition (ON/OFF) of the BK SW. Power switch PW SW is a switch for supplying power of the camera. Pop up switch POP UP SW is a switch to be operated when activating the flash device. Release switch REL SW 4 is a switch for generating a trigger of exposure sequence. Rewind switch REW SW is a switch for rewinding the film on the way, and whenever operated the REW SW, exposed film 29 is rewound into its film cassette. The back cover module 7 is detachable from the main body 3 of the camera as mentioned above, The M microcomputer 26 controls the back cover module 7. The data recording circuit 27 records data magnetically into the magnetic track disposed on the side of the film 29 opposite the emulsion side. The data printing circuit 28 records date data optically onto the film 29.

Figure 3:
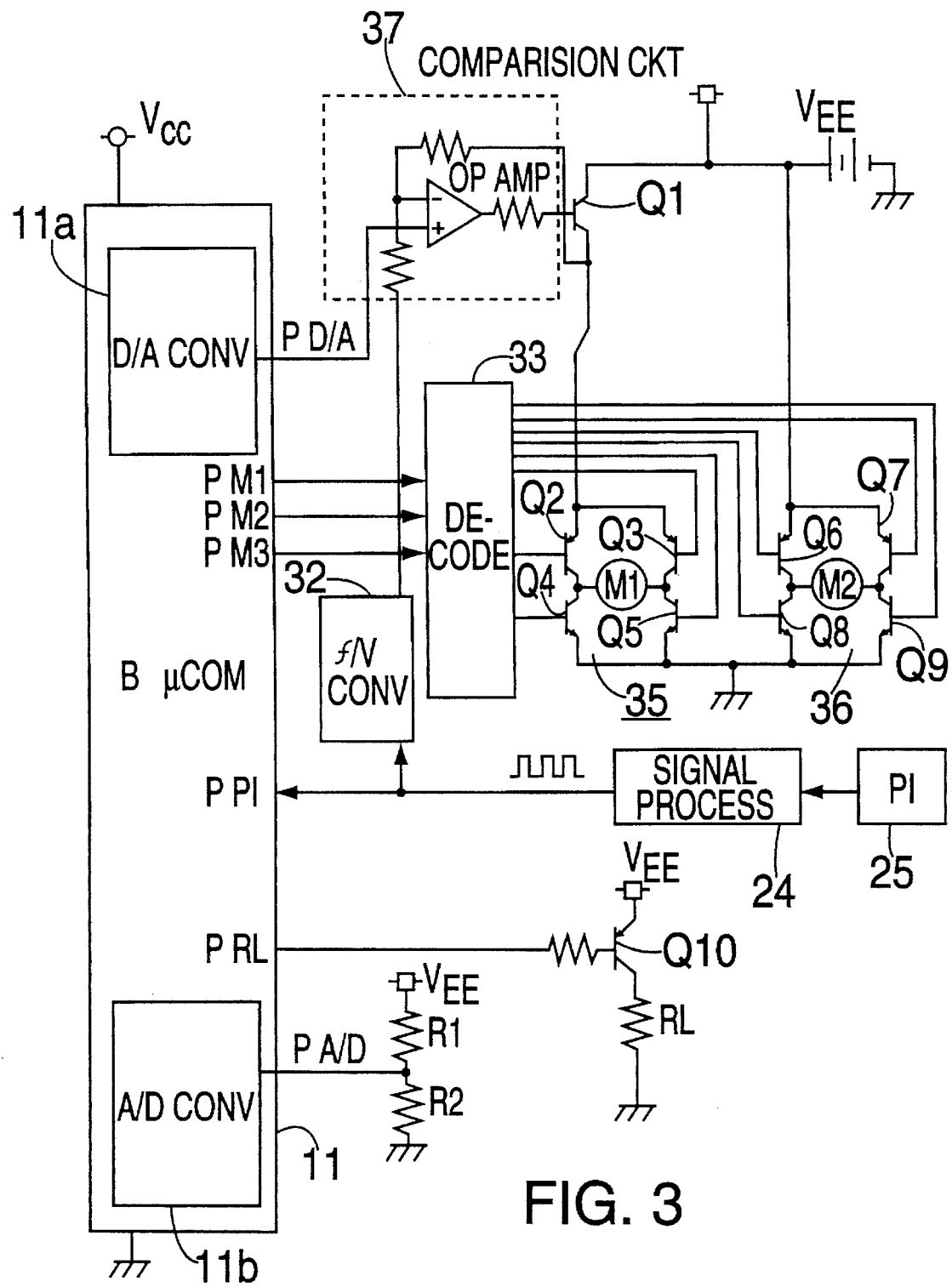
FIG. 3 is an explanatory drawing for explaining in detail the driver circuit 21 and battery check circuit 23.

The driver circuit 21 and the battery check circuit 23 will be described below with reference to FIG. 3. The digital signal related to moving speed of the film decided by the B microcomputer 11 is converted into an analog signal by the D-A converter 11a, which is built in the B microcomputer 11, and the analog signal is transmitted to a comparison circuit 37 as a reference signal for directing moving speed of the film 29. Where the signal compared with the reference signal is the signal from an f-V converter 32. Pulse signal converted from the PI 25 by the signal processing circuit 24 is also inputted into the f-V converter 32. The frequency of the pulse signal is proportional to the moving speed of the film 29, this pulse signal is also transmitted to the B microcomputer 11, where the B microcomputer detects the amount of film movement by counting the pulse signal.

The comparison circuit 37 compares the output of the D-A converter 11a with the output of the f-V converter 32, and regulates supply voltage of the bridge circuit 35 consisted of transistors Q2–Q5 so that above two output values are going to meet, i.e., if the output of the f-V converter 32 is lower than that of the D-A converter 11a, then the comparison circuit 37 raises the base voltage of transistor Q1 as to raise supply voltage of the bridge circuit 35. Thus, the revolution of the motor (M1) for winding and rewinding of the film 29. On the other hand, if the output of the f-V converter 32 is higher than that of the D-A converter 11a, then the comparison circuit 37 lowers the base voltage of transistor Q1 as to lower the supply voltage of the bridge circuit 37. Thus, the revolution of the motor (M1) goes down. Therefore, the film 29 is driven at a speed according to a set signal of the D-A converter 11a. The bridge circuit 36 consisted of transistors Q6–Q9 is used for driving the motor (M2) for initial advance of a film loaded into the camera. The collector resistor RL is a load resistor to be used in the battery check operation. When measuring the battery voltage, the B microcomputer 11 sets PRL from "H" (high level) to "L" (low level), then the transistor Q10 turns on and current from the battery is flown into the load resistor RL. Resistors R1 and R2 are dividing the battery voltage, and the divided battery voltage is inputted into the A-D converter 11b of the B microcomputer 11.

Figure 4:
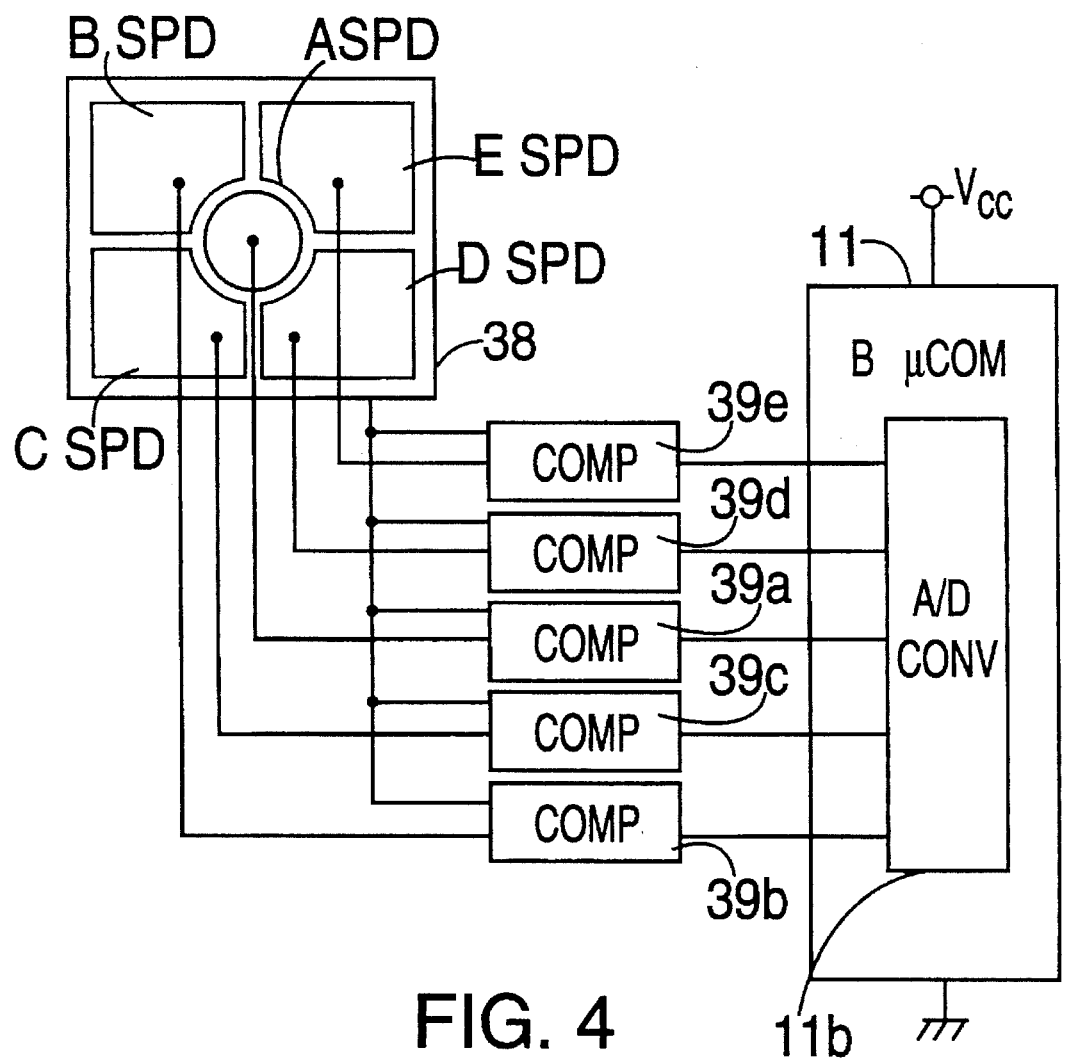
FIGS. 4 and 5 are illustrations for explaining the light measuring circuit 12, and the back cover module 7, respectively.

The detail of the light metering circuit 12 will be described below with reference to FIG. 4. The photoelectric element 38 is divided into five SPDs, i.e., ASPD, BSPD, CSPD, DSPD, and ESPD. Each of the SPDs receives luminous of the corresponding portion of the field, and generates each photoelectric currents. Each of the photoelectric currents is inputted into the corresponding compression circuits 39a–39e, respectively. In the compression circuits 39a–39e, the photoelectric currents are compressed logarithmically, and applying them into the A-D converter 11b of the B microcomputer 11. Where the B microcomputer 11 calculates five photometric values (BvA, BvB, BvC, BvD, and ByE) by the luminous data from the A-D converter 11b and the adjust data in the memory circuit 18.

Figure 5:
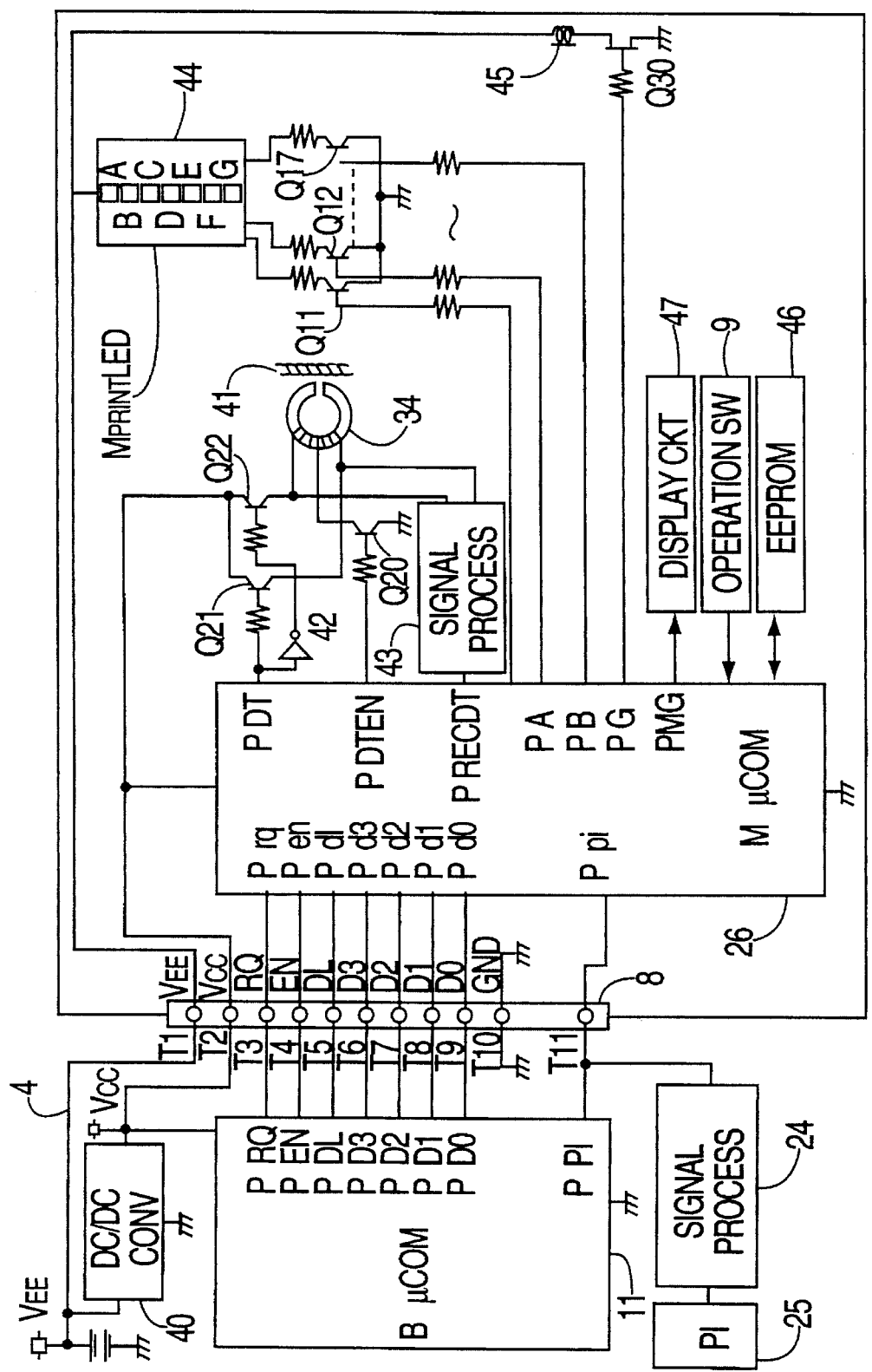

The detail of the back cover module 7 will be described below with reference to FIG. 5. The communication line between the B microcomputer 11 and the M microcomputer 26 is connected through the connector 8 which has eleven terminals, battery voltage Vee of the main body 3 of the camera being connected to a terminal T1, output voltage Vcc of the DC-DC converter 40 being connected to a terminal T2, communication lines between the B microcomputer 11 and the M microcomputer 26 being connected to terminals T3–T9. Communication request signal RQ being outputted to a terminal T3, a communication enable signal EN being outputted to a terminal T4, data latch signal DL being outputted to a terminal T5, and the data D0–D3 being outputted to terminals T6–T9. The method of communication between the B microcomputer 11 and the M microcomputer 26 will be described later. In the present embodiment, the digital data are handled in four bit units. The data can be handled in units of eight bits in order to obtain a fast communication, and the method of communication can be in serial form in order to reduce the number of communication lines.

The pulse signal caused by the signal processing circuit 24 in the main body 3 of the camera is transmitted to the M microcomputer 26 in the back cover module 7 through the terminal 11, wherein the pulse signal is generated in response to the movement of the film 29. The B microcomputer 11 detects the amount of film movement on the basis of the pulse signal inputted from the PPI. The M microcomputer 26 executes optical data printing and magnetic data recording to the film, and also executes data reproducing from the magnetic track of the film in synchronizing to the pulse signal from the PPI. The power of the M microcomputer 26 is supplied by the DC-DC converter 40 in the main body of the camera. The M printing LED 44 prints various kinds of data onto the adjacent portion below the exposure area. Each of the LED of the light segments turning on when transistor Q11–Q17 turns on, where each of the transistors is turns on when the output port PA–PG is set to a high level "H". The transistor Q30 is provided for driving the solenoid 45, as current flowing to the solenoid 45 causes the magnetic head 34 to abut the film 29 when the output port PHG is set to high level "H" The EEPROM 46 temporarily stores the data to be supplied to the magnetic head 34. The data should be stored before rewinding operation of the film 29 because the operation of data printing is executed in association with the rewinding of the film 29. The data stored in the EEPROM 46 are changeable by the operating switch 9. The display circuit 47 indicates various recorded data in the EEPROM 46 in response to the operation of the M microcomputer 26.

Figure 6:
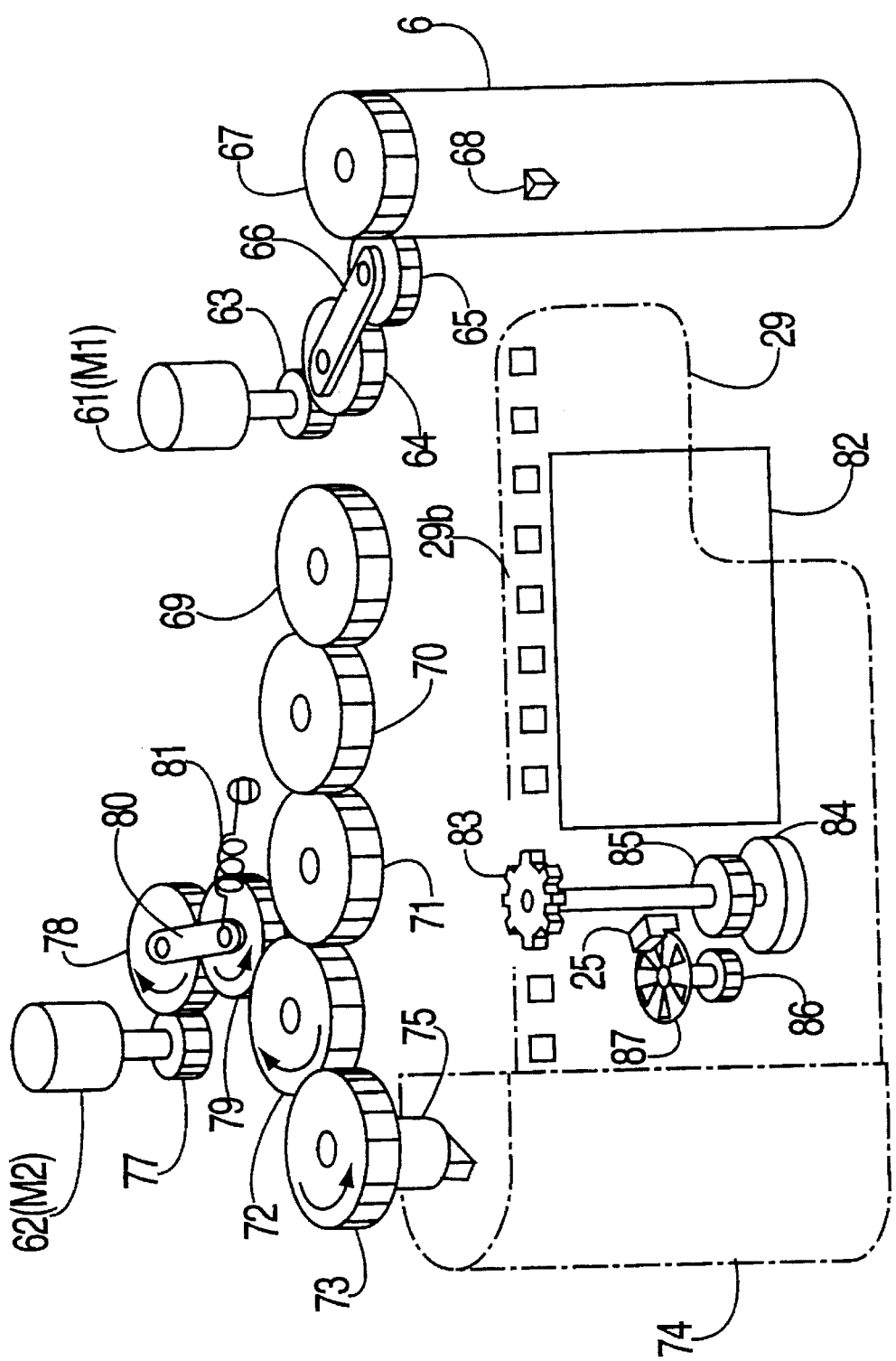
FIGS. 6–8 are perspective views illustrating the film feeding mechanism 22 from the back side of the main body 3 of the camera, the back cover module 7 being mounted to the main body 3 of the camera, and a film cassette, respectively.
Figure 7:
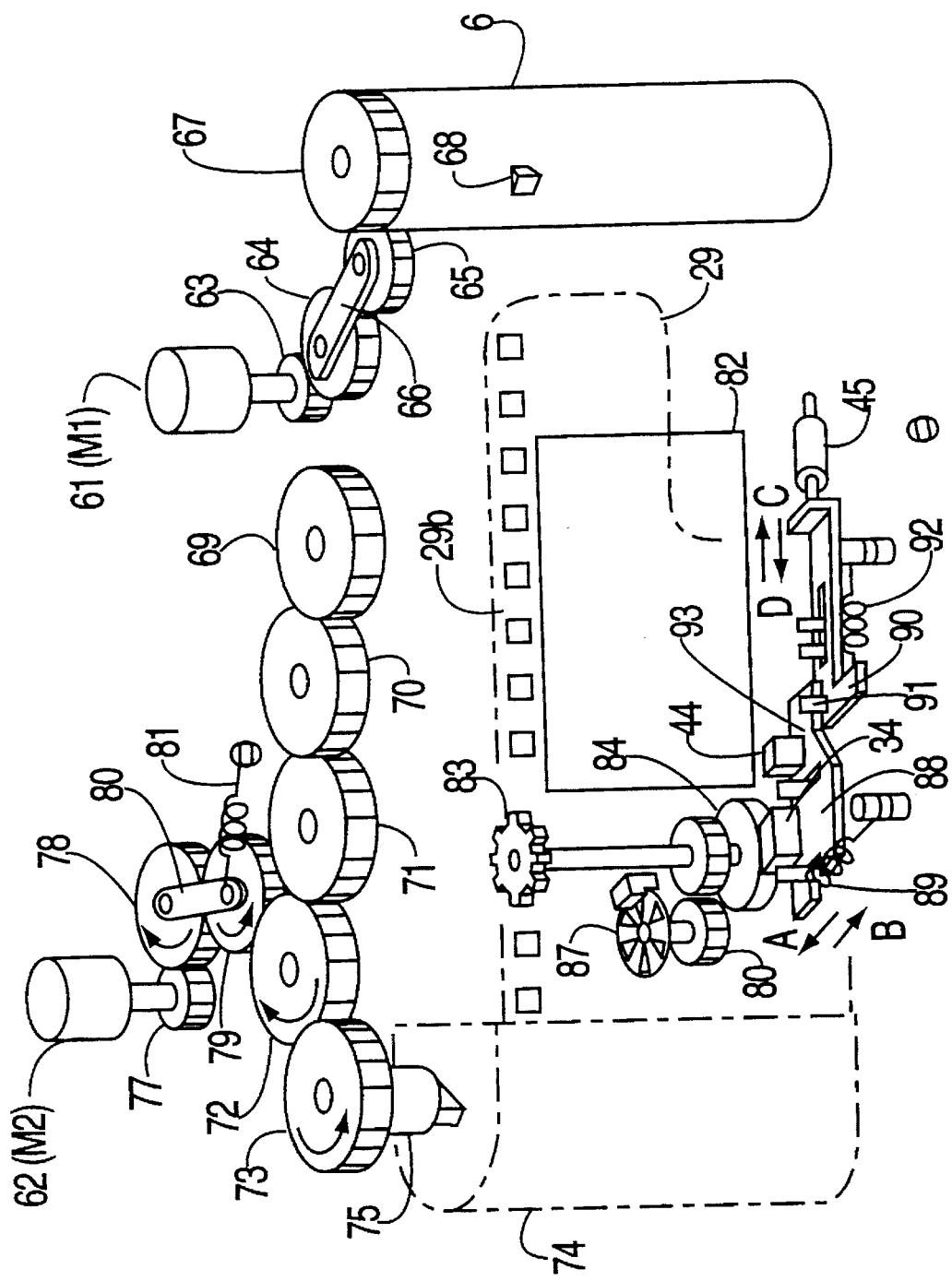
Figure 8:
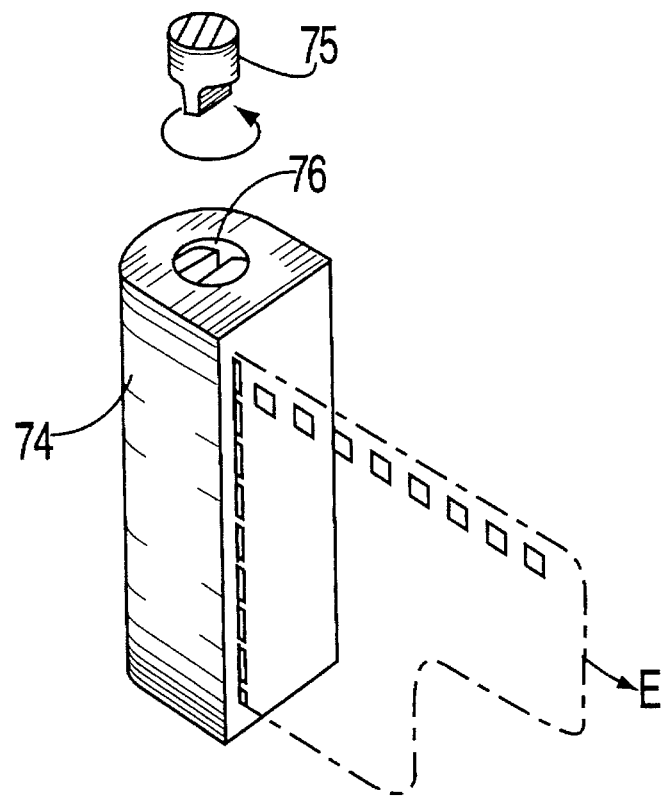

The detail of the film feeding mechanism 22 and in the first embodiment will be described below with reference to FIGS. 6–8. FIG. 6 is a perspective view illustrating the film feeding mechanism 22 from back side of the main body 3 of the camera, FIG. 7 is a perspective view illustrating the back cover module 7 mounted to the main body 3 of the camera, and FIG. 8 is a perspective view illustrating a film cassette, respectively. In FIGS. 6–8, a pinion gear 63 is mounted onto the output shaft of the motor (M1) 61, which is provided in the main body 3 of the camera for winding and rewinding the film, wherein the pinion gear 63 meshes with a sun gear 64. The sun gear meshes with a planetary gear 65, where the planetary gear 65 is supported via a gear arm 66 to enable the planetary gear 65 to revolve around the sun gear 64. The take up spool 6 for winding the film is rotatably provided, which is disposed in the film take up chamber (not shown) being provided in the right side of the camera from back side thereof. A spool gear 67 for meshing with the planetary gear 65, when the planetary gear 65 is revolving around the sun gear in the counter clockwise direction, is integral with the upper face of the take up spool 6. A ratchet 68 for matching the perforation of the film is projected on the bottom surface of the take up spool 6. An idle gear 69 is disposed in the position of meshing with the planetary gear 65 when the planetary gear 65 is revolving around the sun gear in the clockwise direction. In this condition, the planetary gear 65 will be meshed with a coupler gear 73 via the idle gear 69, 70, 71, and 72 as shown in FIGS. 6–7.

On the other hand, in the left side of the camera viewed from the back side thereof, there is provided a film cassette chamber 5 for housing the film cassette. The coupler gear 73 is rotatably provided above the film cassette with a coupler 75 projecting from its end portion as a minus (–) shape. The coupler 75 being matched with the spool ditch on the upper face of the film cassette, and being integral with the spool ditch around the axis.

A motor (M2) 62 for delivering the film is disposed in the main body 3 of the camera, a pinion gear 77 is mounted onto the output shaft of the delivering motor 62, and is meshing with the sun gear 78. A planetary gear 79 is supported to enable it to revolve around the sun gear 78. Only when the film delivering motor (M2) 62 is revolving in the counter clockwise direction, does the planetary gear 79 mesh with the idle gear 72, because of the tension on the gear arm 80 generated by the spring 81. The film 29 is exposed by the light flux from an exposure opening 82 built into the main body 3 of the camera. A sprocket wheel 83 is provided near the opening 82, where the sprocket wheel 83 meshes with perforation 29b of the film 29. The sprocket wheel 83 rotates in response to the movement of the film 29. A gear 85 is provided integral with a pressure roller 84 on the shaft of the sprocket wheel 83, the gear 85 meshes with a gear 86. A disk with radial slits 87 is also provided on the shaft of the gear 86. When the sprocket wheel-83 rotates, the disk 87 is rotated with increasing revolution by the gears 85 and 86. Whenever the radial slit of the disk 87 crosses the PI 25, the PI 25 generates an output signal, where the output signal is converted into a pulse signal by the signal processing circuit 24.

A mechanism for pressing the magnetic head 34 against the film 29 is built in the back cover module 7. The magnetic head 34 is disposed against the pressure roller 84 enabling it to catch the film 29. The magnetic head 34 and the M printing LED 44 are both arranged on a base 88 which can slide in the direction noted by the arrows A and B in FIG. 7. When the solenoid 45 is not driven, the magnetic head 34 can not touch the film 29, because of the tension to the base 88 provided by a spring 89. The output shaft of the solenoid 45 is fixed to a base 90 which can slide in the direction noted by the arrows C and D. A pin 91 is fixed at the position in FIG. 7. In spite of the tension to the base provided by a spring 92, when the solenoid 45 is driven, the base 90 slides in the direction noted by the arrow D, the pin 91 slides along the side face 93 of the base 88, the base 88 slides against the tension of the spring 89 in the direction noted by the arrow A, and then the magnetic head 34 presses against the film 29.

The detail of the method of communication between the B microcomputer 11 and the M microcomputer 26 will be described below with reference to FIGS. 9–15. In this embodiment, as B microcomputer 11 takes the leadership in communication, a communication request signal is generated by the B microcomputer 11. The B microcomputer 11 sets PRQ from high level "H" to low level "L", which represents a communication request directed to the M microcomputer 26. When the M microcomputer 26 becomes able to communicate, the M microcomputer 26 sets Pen from high level "H" to low level "L", which means communication is enabled. Then the B microcomputer 11 transmits command data to PD0–PD3, where the data are in eight bit units. The higher nibble (four bits) and the lower nibble (four bits) of each eight bit unit is transmitted separately, because of the use of a four bit data bus configuration. A latch signal for latching the nibble data is transmitted to the PDL. The data transmitted at first is command data. The M microcomputer 26 discriminates communication mode using the command data, and executes operation in response to the communication mode. When finishing the operation, the M microcomputer 26 sets Pen from low level "L" to high level "H". When detecting transition of Pen, the B microcomputer 11 sets PRQ from low level "L" to high level "H", then the communication is terminated.

Figure 9:
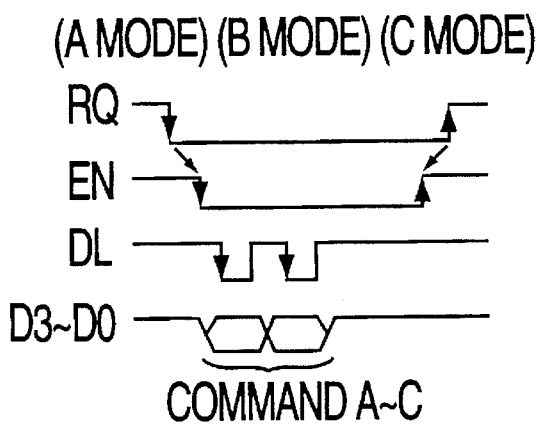
FIG. 9 is a time chart showing operation of the camera in mode A-C.

The operations of A-C modes will be described below with reference to the time chart of FIG. 9. The A mode is a mode with no special operation, when receiving command A, the M microcomputer 26 keeps Pen at the low level "L" within predetermined period of time. The B microcomputer 11 uses the A mode in order to discriminate whether the back cover mounted to the camera is the back cover module 7 or a conventional one. That is the reason why the M microcomputer 26 needs no special operation. In the B mode, when receiving command B, the M microcomputer 26 enables current to flow into the solenoid 45, and the magnetic head is pressed to the film 29. In the C mode, when receiving command C, the M microcomputer 26 disables the flow of current in the solenoid 45, causing the magnetic head 34 to separate from the film 29.

Figure 10:
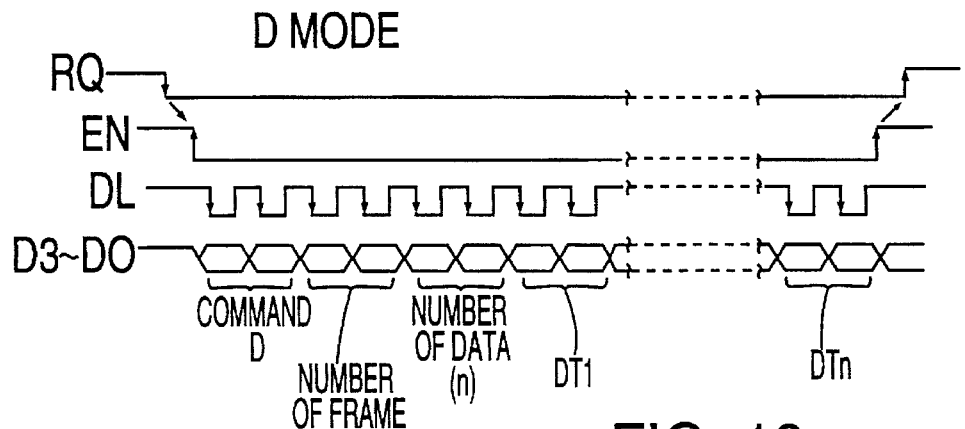
FIGS. 10–14 are time charts showing operation of the camera in mode D-H, respectively.

The operation of D mode will be described below with reference to the time chart of FIG. 10. The D mode is a mode which photographing data to be recorded by the magnetic head and M printing LED 44 onto the film 29 are stored into the EEPROM 46 of the back cover module 7. After transmitting command D, the B microcomputer 11 transmits record data DT1DT(n) to the M microcomputer 26. The current frame number data are used for reserving the area in the EEPROM 46, the number of data (n) is added for the convenience of the M microcomputer 26 in receiving the data.

Figure 11:
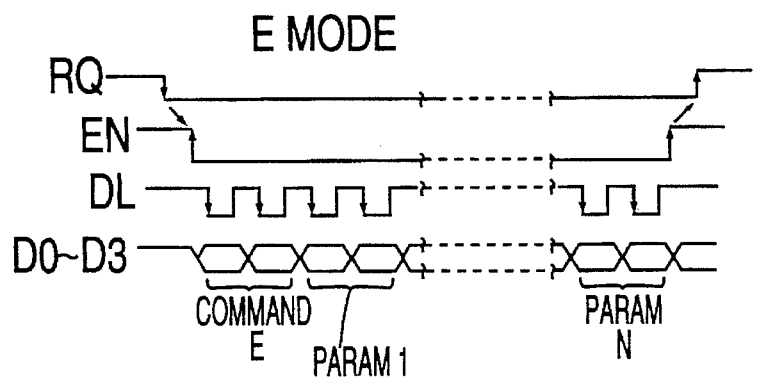

The operation of E mode will be described below with reference to the time chart of FIG. 11. After transmitting command E, the B microcomputer 11 transmits parameters O-N to the M microcomputer 26, where the parameters are stored in the memory circuit 18 and used by the M microcomputer 26 when executing operation of recording onto the film 29.

Figure 12:
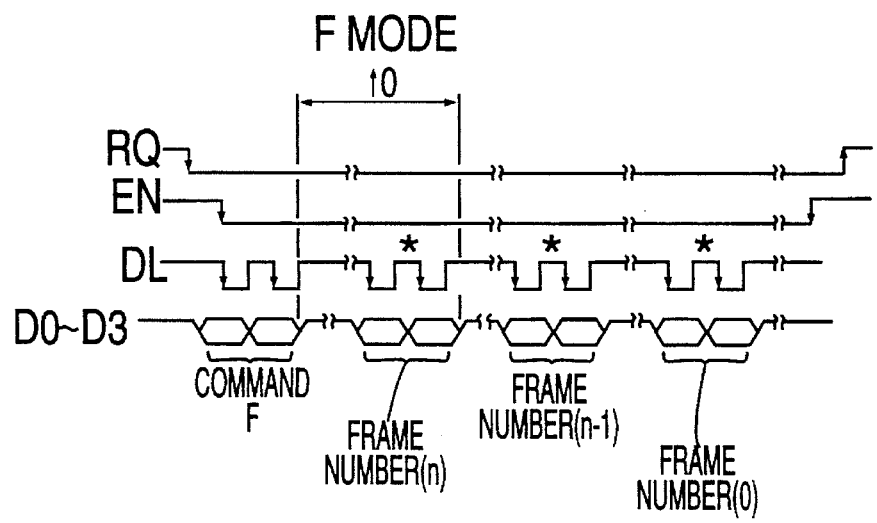

The operation of F mode will be described below with reference to the time chart of FIG. 12. The F mode is a mode which the data stored in the EEPROM 46 are recorded onto the film 29 by the magnetic head 34 and the M printing LED 44. The communication of the F mode is carried out when rewinding the exposed film into the film cassette. After transmitting command F, the B microcomputer 11 transmits record start signal, where the record start signal itself represents the current frame number. When receiving the current frame number data, the M microcomputer 26 reads out data in the corresponding area of the EEPROM 46, and data set for one frame are recorded onto the film 29 in synchronism with the pulse signal of the PI 25.

Figure 13:
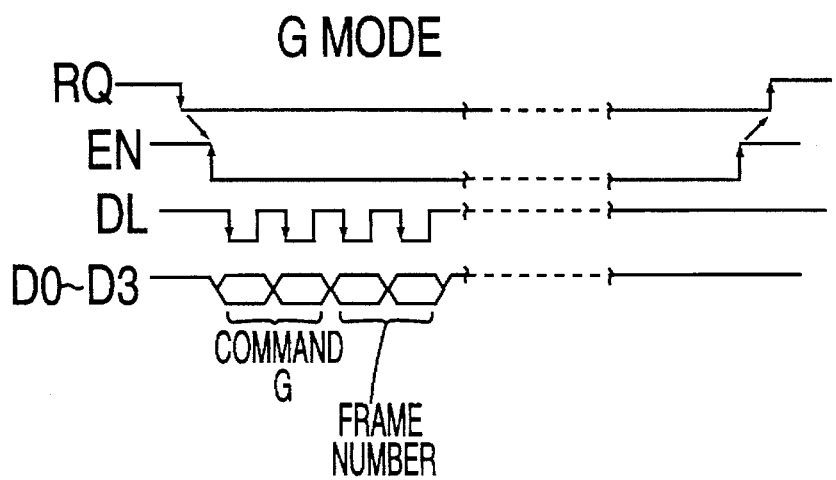

The operation of G mode will be described below with reference to the time chart of FIG. 13. G mode is a mode which the recorded data on the magnetic track 41 are reproduced. After transmitting command G, the B microcomputer 11 transmits current frame number, where the current frame number indicates the memory area of the EEPROM 46 is where the reproduced data is to be stored. The M microcomputer 26 reproduces data for one frame from the magnetic track 41 and stores them into the directed area of the EEPROM 46.

Figure 14:
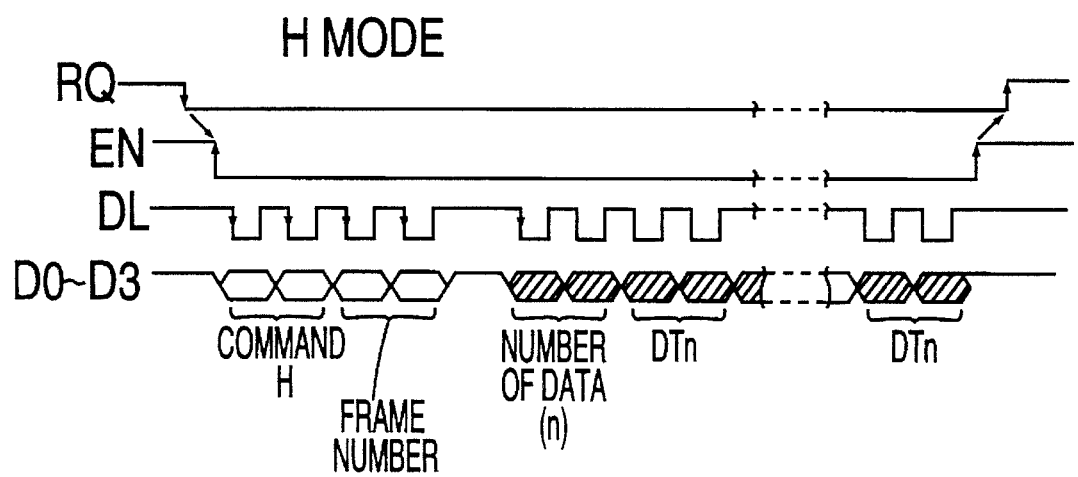

The operation of H mode will be described below with reference to the time chart of FIG. 14. In the H mode, the B microcomputer 11 can read out the data stored in the EEPROM 46. After transmitting command H, the B microcomputer 11 transmits current frame number. The M microcomputer 26 reads out the data stored in the area directed by the current frame number, and transmits them to the B microcomputer 11, where DT1–DTn denotes the current frame number. The data number (n) is added for the convenience of the B microcomputer 11 in receiving the data.

Figure 15:
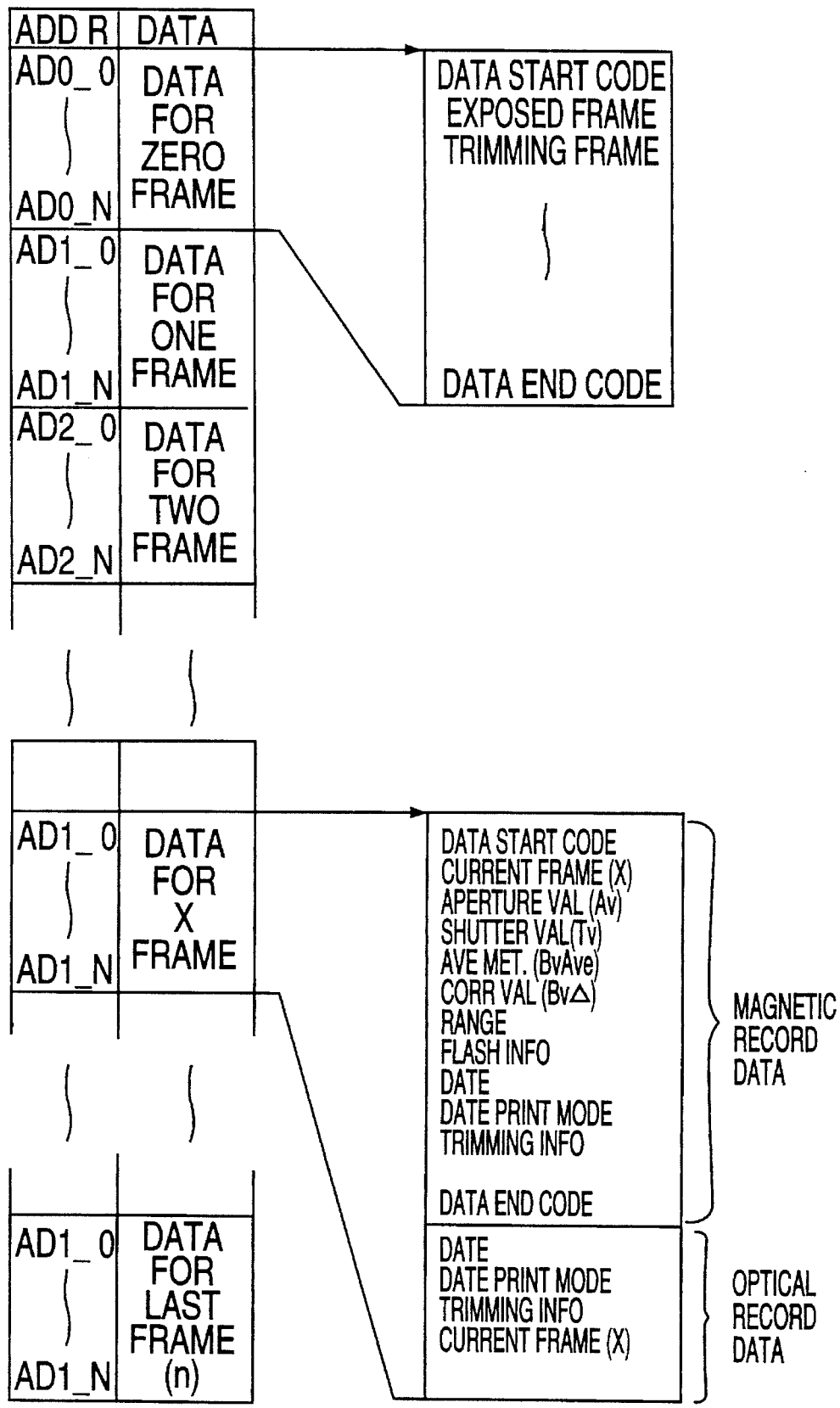
FIG. 15 is an illustration showing a memory map of the EEPROM 46 connected to the M microcomputer 26.
Figure 16:
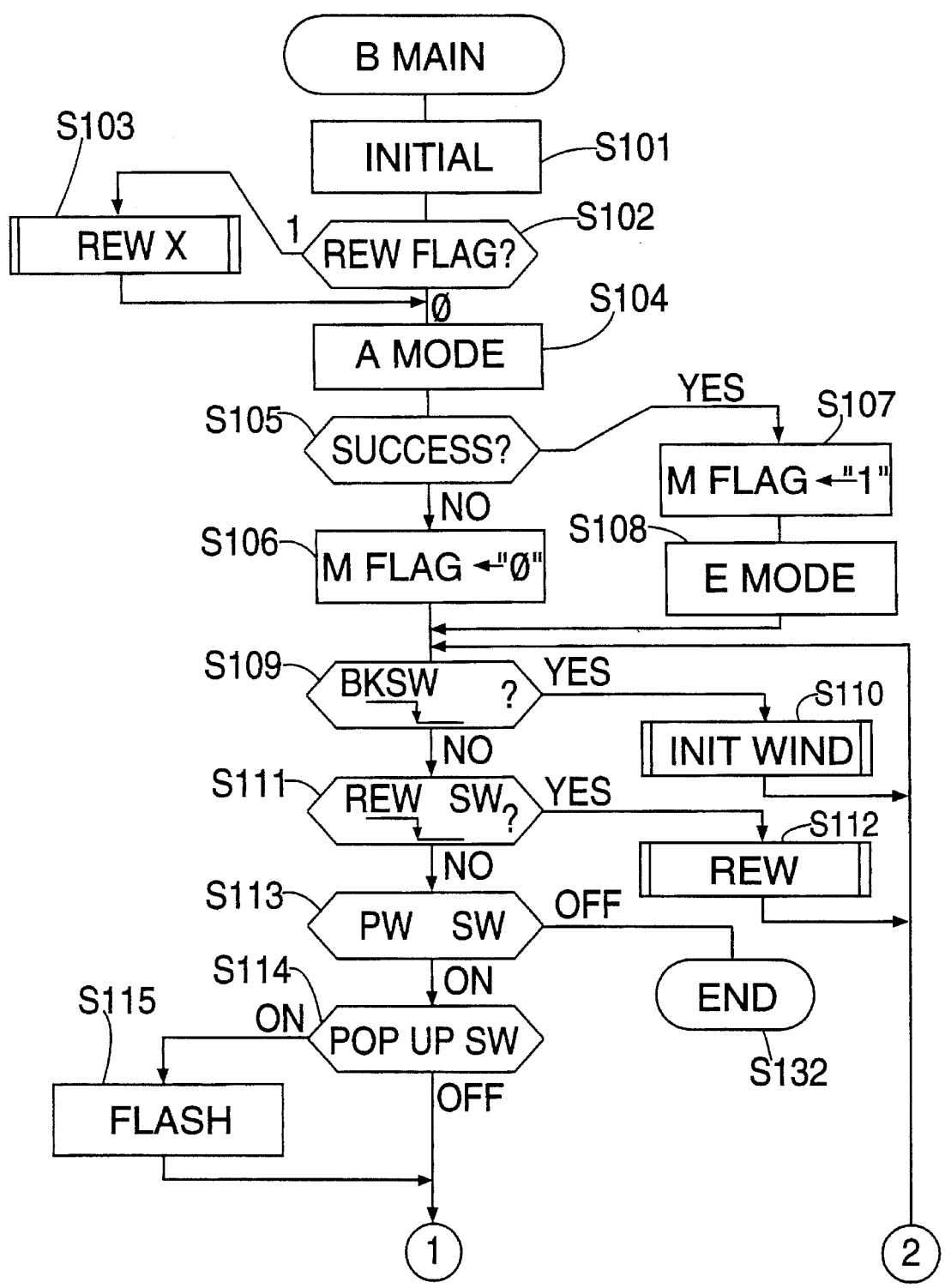
FIGS. 16 and 17 are flow charts for explaining the operating sequence of the camera in the main routine according to this embodiment.
Figure 17:
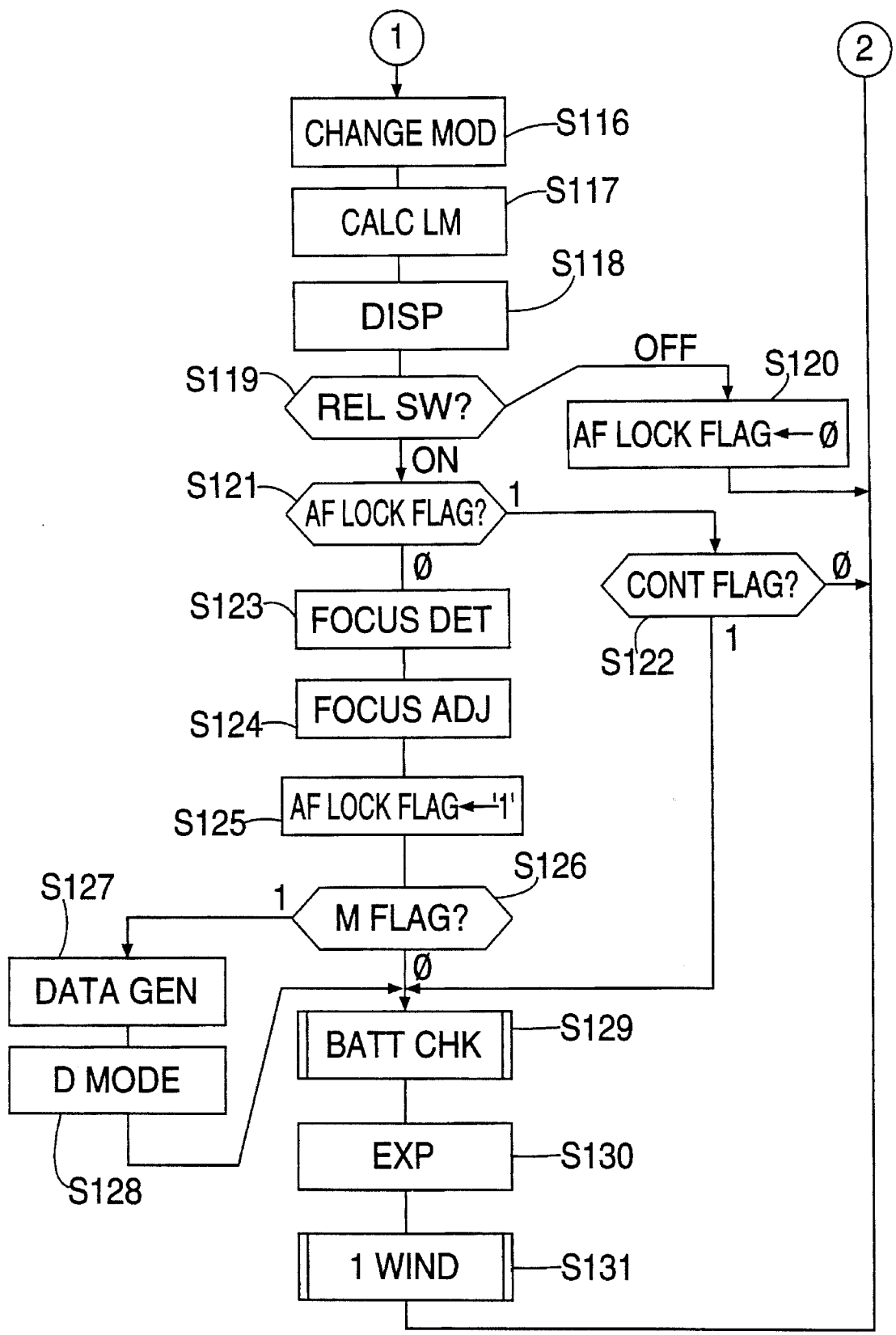

The memory map of the EEPROM 46, connected to the M microcomputer 26, will be described below with reference to FIG. 15. The EEPROM 46 is partitioned in a plurality of areas, with each areas having data corresponding to one frame. These data are recorded onto the film 29 by the magnetic head 34 and the M printing LED 44 when the film 29 is rewound into the film cassette 74. The data corresponding to frame zero are recorded in the address ADOO-ADON. Frame zero of the film is not allowed to be exposed, but is allowed to be recorded into the magnetic track. Therefore, the area for frame zero is mainly used for managing the film 29 by the processing laboratory. The number of exposed frames is recorded in order to prevent double exposure, while the number of the trimming frame is also recorded for convenience in the film processing. Each of the areas of EEPROM 46, from frame one to frame n are divided into two sub-areas as shown, one sub-area storing the data to be recorded to the magnetic track of the film and the other sub-area storing the data to be printed to the outside portion below the exposure area by the M printing LED 44. The stored data are shown for example. The date, print mode, and trimming information data are required to be recorded both magnetically and optically, where the print mode data will be described later.

In general, magnetic recording method is allowed to change data, however, the recorded data may get failure when there is careless accessing of a magnet to the media. Therefore, data that has no possibility of changing, such as date data, should not be recorded only by the magnetic recording method to prevent the possibility of losing such data due to data failure. On the other hand, the optical recording method does not permit data to change after developing the film. Therefore, data which may possibly change, such as date print mode and trimming information, should not be recorded only by the optical recording method.

For the above mentioned reason, in this embodiment, these three data are recorded to the film using both recording methods.

The operation of the B microcomputer 11 will be described below with reference to the flow charts of FIGS. 16–24. The operating sequence in the main routine of this embodiment is described with reference to the flow chart of FIG. 16. When the PW SW is turned on, the B microcomputer 11 starts the DC-DC converter 40 and initializes the I/O ports and the memories (step S101). The B microcomputer 11 discriminates whether or not the rewind flag is set (step S102). If the rewind flag is set "1", the flow advances to step S103 and executes subroutine "rewind X", then next step S104 is performed. On the other hand, if the rewind flag is not set, then the flow advances to step S104 directly. The rewind flag is set whenever the rewinding operation of the film 29 is terminated on the way. In step S104, the A mode communication is carried out in order to discriminate whether the back cover module 7 is mounted to the camera or not, if the back cover mounted to the camera is other than the back cover module 7, as no communication is available, then the flow advances from step S105 to step S106, making the M flag reset "0". Whenever the M flag is "0", no communications are executed, thus the operating mode allows no information to be recorded to the film 29. In step S104, if the A mode communication is accomplished, the flow advances from step S105 to step S107, and the M flag is set "1", thus the operating mode allows information to be recorded to the film 29. After this step, the E mode communication is executed, wherein the M microcomputer 26 receives the parameters for data printing and data recording.

In step S109, the state of the operation SW 9 of the back cover module 7 is detected, when the BKSW makes the transition from OFF to ON, which means a film cassette is being loaded into the cassette housing 5 and the back cover is being closed, then step S110 is performed. In step S110, subroutine "initial winding" (which will be described below) is performed. If the state of the BKSW of the back cover module 7 makes no transition, the next step Sill is performed, and being detected the REW SW. When discriminating the REW SW is operated, the next step S112 is performed, and subroutine "rewind" is executed. The flow advances to step S109 after recording to the magnetic track 41 of the film 29 in response to rewinding of the film 29. When detecting no transition in the REW SW, step S113 is performed. In step S113, the state of the PW SW is detected, if the PW SW is OFF, the B microcomputer 11 turns off the DC-DC converter and terminates operation of the B microcomputer 11. If the PW SW is ON, the next step S114 is performed. In step S114, the state of the POP UP SW is detected. If the POP UP SW is ON, which means allowing to operate the flash, then step S115 is performed and the command for charging the main capacitor of the flash is transmitted to the flash control circuit 19.

In step S116, the subroutine "mode change" is executed, wherein the mode is changed in response to the operation of the mode SW 1. In step S117, the average light metered value BVAVE and the compensation value of the light metering BvA are calculated among five light metered values by the light metering circuit 12, the shutter time value and the aperture value are also calculated. Where the BvA is data which is varying in accordance with the amount of trimming which will be described later. In step S118 the exposure condition, current frame number, and date are indicated in the display 2. In the trimming mode, the trimming area is indicated in the view finder of the camera in accordance with the amount of trimming.

In step S119, the state of the REL SW 4 is detected, if the REL SW is OFF, step S120 is performed clearing the AF LOCK flag, and returning the flow to step S109. On the other hand, if the REL SW is ON, then the next step S121 is performed. The state of the AF LOCK flag is detected in step S121, if the AF LOCK flag is set "1", then step S122 is performed, and the state of the continuous exposure flag is detected. Where the continuous exposure flag is set, as when setting the camera to the continuous exposure mode, the camera carries out a continuous exposure operation when the REL SW is ON. The operation of the focus adjusting is only done once for the first time of the exposure operation, so that the communication between the main body 3 of the camera and the back cover module 7 is also allowed only once for the first time of the exposure operation. If the continuous exposure flag is "1", then step S129 is performed. However, if the continuous exposure flag is "0", then step S109 is performed because the camera is being inhibited from exposing continuously. That is, until the REL SW 4 is OFF and the AF LOCK flag is "0" at step S120, the exposure operation is disabled.

In step S121, if the AF LOCK flag is detected as "0", then the next step S123 is performed. The distance from the object is measured by the distance measuring circuit 13 (step S123), controlling the focus adjusting mechanism 16 in accordance with the measured distance (step S124), setting "1" the AF LOCK flag (step S125), and checking the existence of the back cover module 7 by the M flag (step S126). In step S126, if judging the M flag being set "1", then step S127 is performed, and preparing the data to be stored in the EEPROM 46 of the back cover module 7. These prepared data are then transferred to the M microcomputer 26 by the D mode communication (step S128). In step S129, the subroutine "battery check" is executed, and the film is exposed in accordance with the exposure conditions calculated in step S117 (step S130), executing the subroutine "winding one frame" (step S131), effecting step S109, and repeating above mentioned operation until the PW SW is turned off in step S113.

Figure 18:
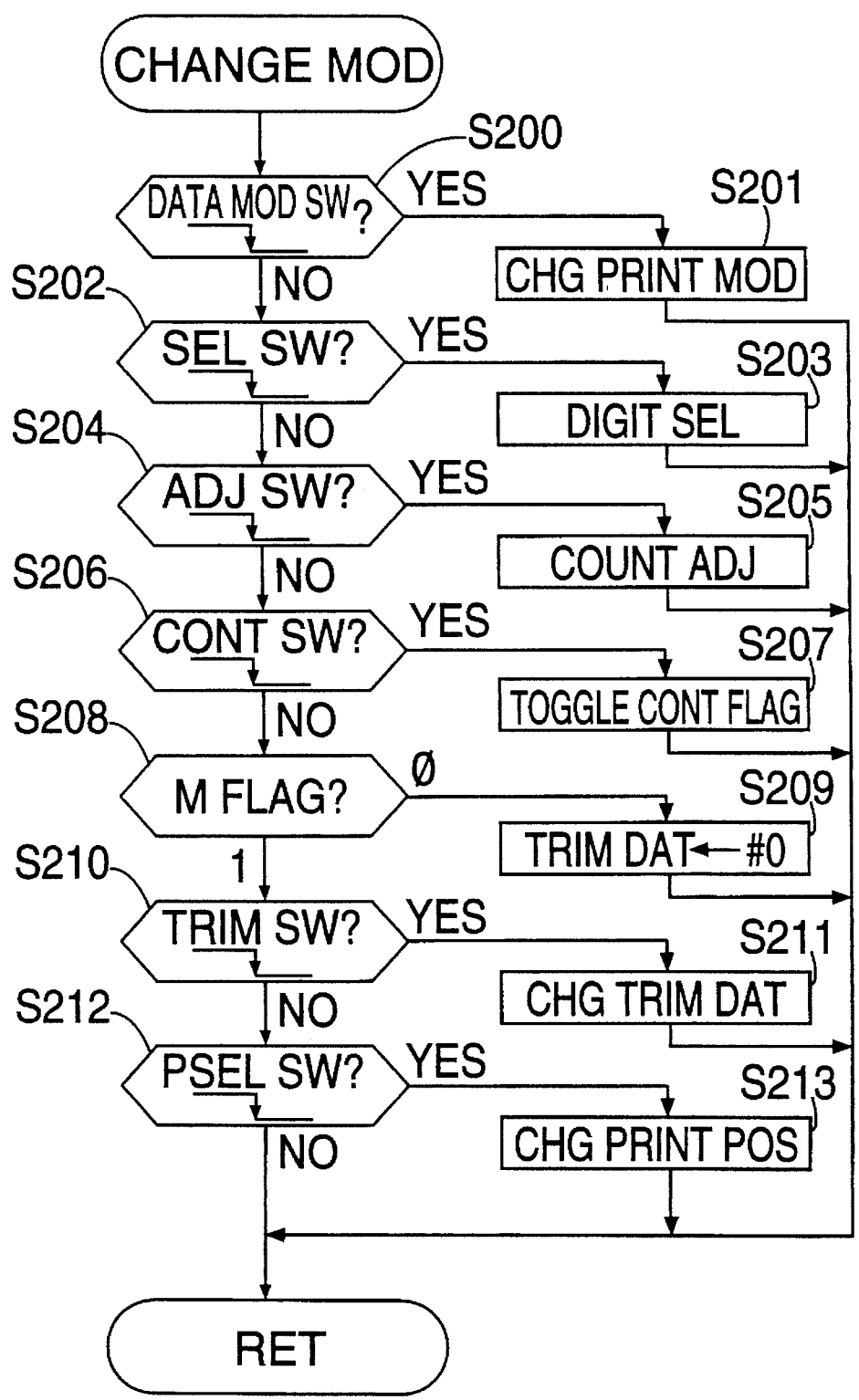
FIGS. 18–24 are flow charts for explaining the operating sequence of the camera in the subroutine "mode change", "initial winding", "one frame winding", "rewinding", and "battery check", respectively.
Figure 19:
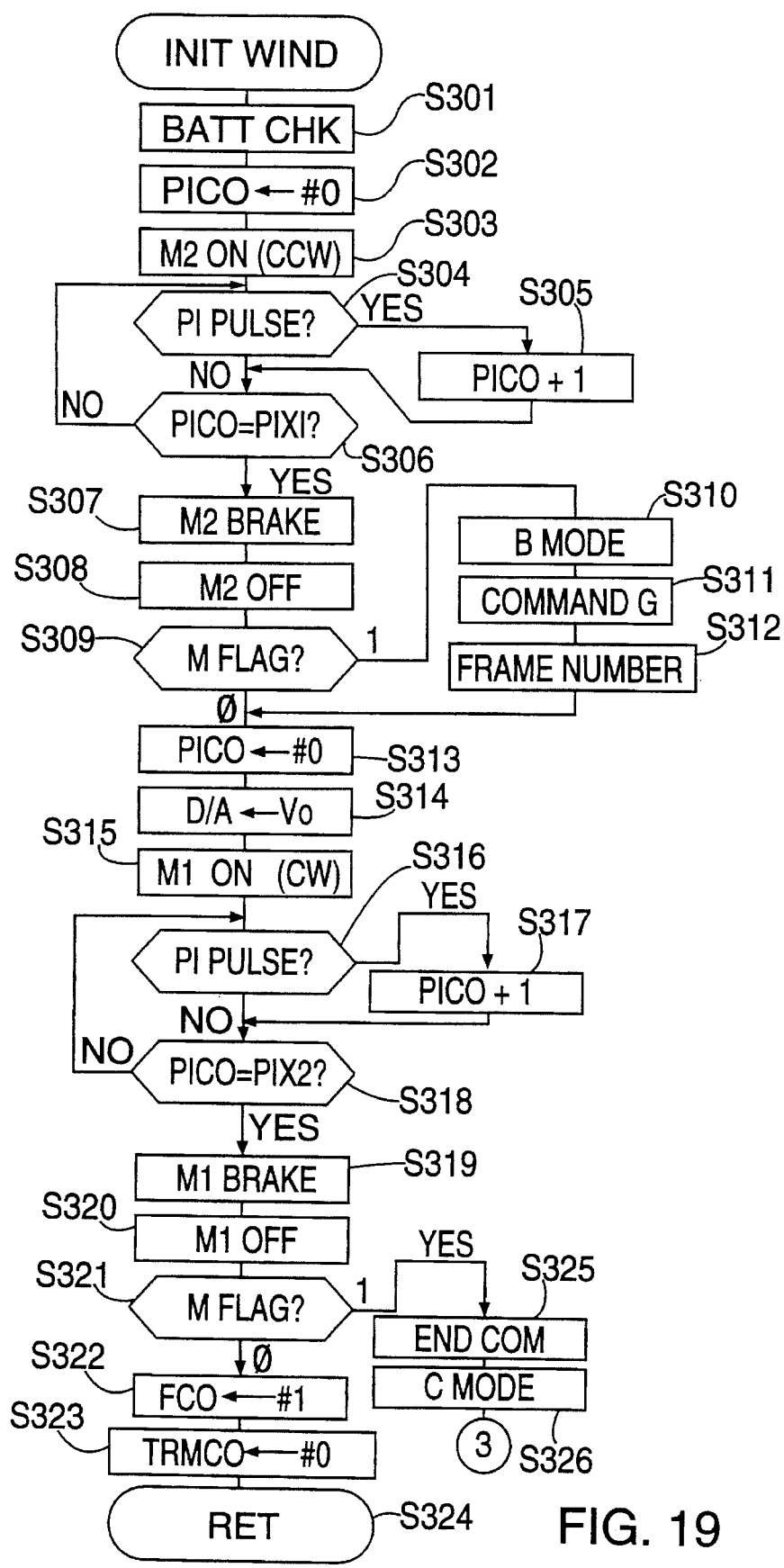
Figure 20:
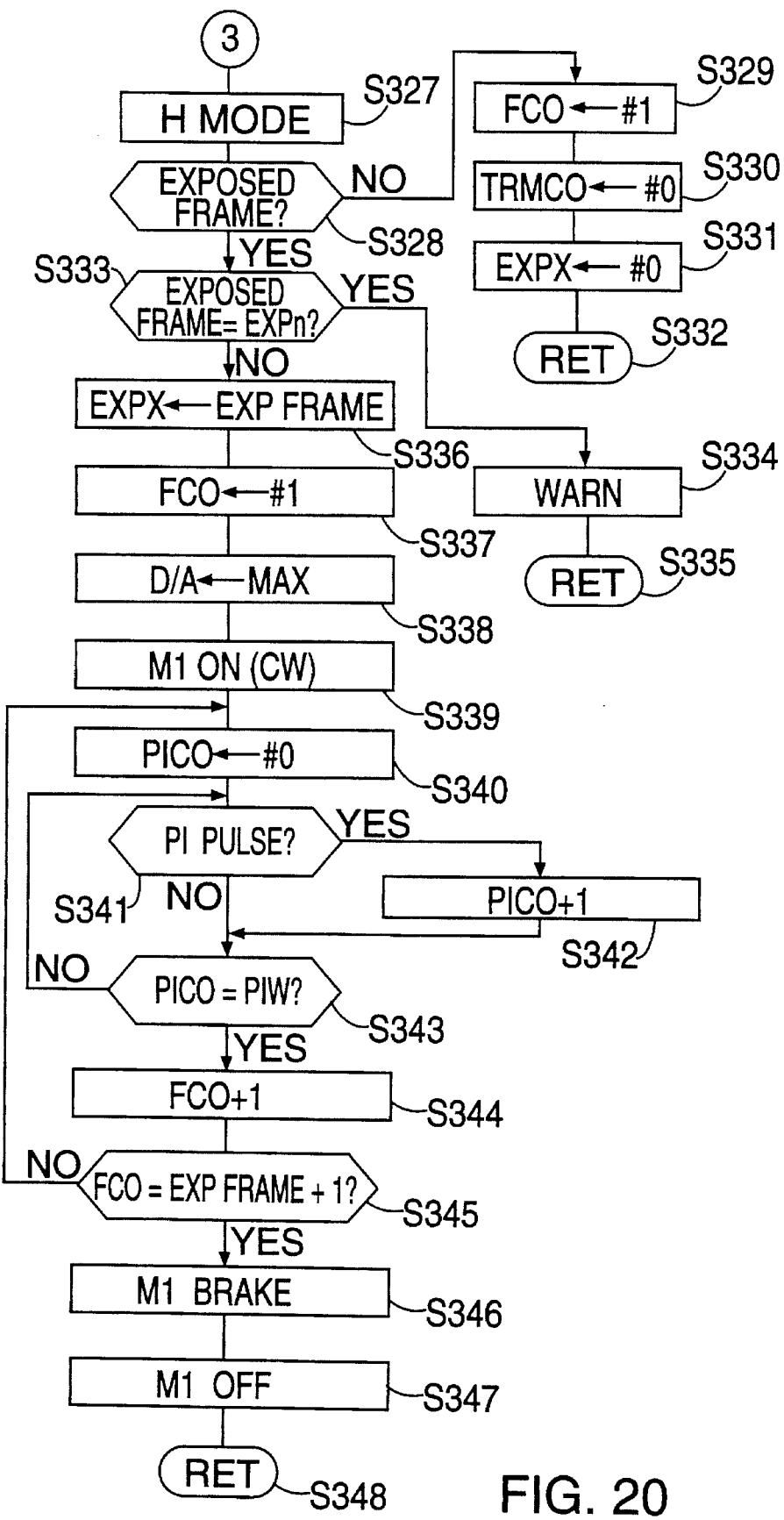
Figure 25:
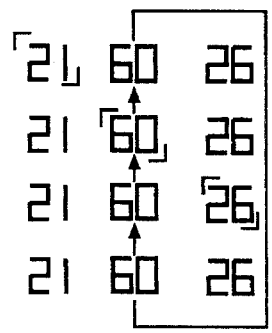
FIGS. 25 and 26 are illustrations showing indication change in response to the state of DATE MOD SW, and SEL SW, respectively.
Figure 26:
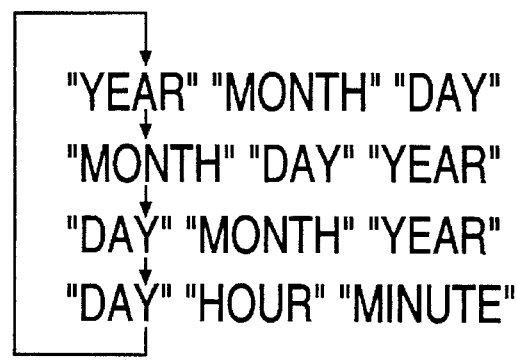

The operating sequence of the subroutine "mode change" will be described below with reference to the flow chart of FIG. 18. In step S200, the state of the DATE MOD SW as one of the mode switches is detected, wherein operating this switch, step S201 is performed, and a command for changing the printing mode to the date control circuit 30 is generated. Four date printing modes are provided. The camera changes its mode whenever the DATE MOD SW is operated as shown in FIG. 26, where the date printing mode is indicated in the display circuit 17. In step S202, the state of the SEL SW is detected, if the SEL SW is operated, then step 8203 is performed, and a command for directing the amending digit is transmitted. The display of the indicating circuit is changed whenever the SEL SW is operated as shown in FIG. 25. The digit indicated between the square brackets is the selected digit. The selected digit is indicated by flashing it. In step S204, the state of the ADJ SW is detected, if the ADJ SW is operated, then step S205 is performed, and the corresponding counter in the date control circuit is amended.

Figure 27:
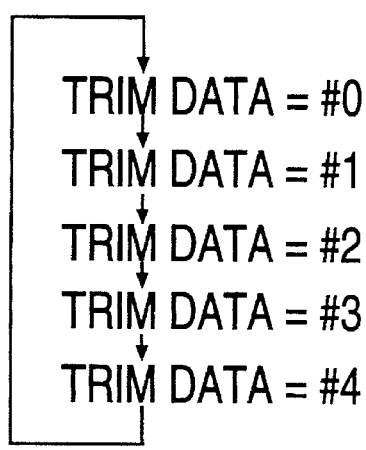
FIGS. 27 and 28 are illustrations showing trimming data change, and printing format of the date, respectively.

In step S206, the state of the CONT SW is detected, if the CONT SW is operated, step S207 is performed, toggling the CONT flag. Continuous exposure is allowed when the CONT flag is set "1". In step S208, the state of the M flag is detected, if the M flag is "0", then #0 is set as trimming data in step S209, because no data recording to the film 29 is available without the back cover module 7. If the M flag is "1", then step S211 is performed, and the state of the TRIM SW is checked. If the TRIM SW is operated, then step S211 is performed, and the trimming data is changed as shown in FIG. 27.

Figure 28:
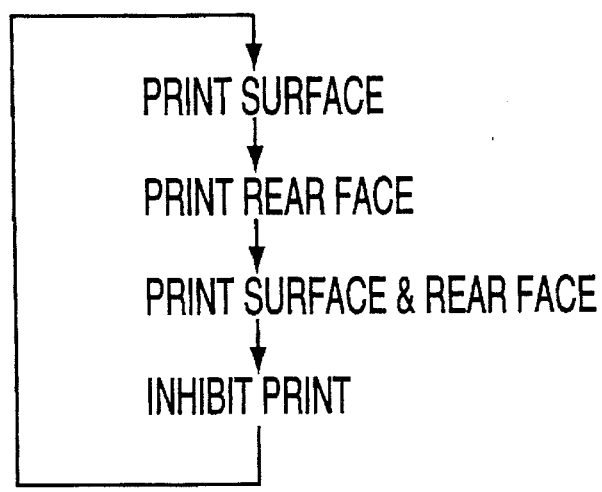

In step S212, the state of the PSEL SW is detected. If the PSEL SW is operated, then step S213 is performed, and the date printing mode as shown in FIG. 28 is changed. The format of the data to be printed to the film 29 is changed in accordance with the printing mode. Whenever the PSEL SW is allowed to operate, the printing operation of the date within the exposure area by the B printing LED 31 is disabled, because date printing can be done by the processing laboratory from the data recorded on the film. Trimming photography may cause print data, which is printed within the exposure area of the film, to be lost when printing it to the printing paper. However, date data can be printed by the processing laboratory regardless of the trimming photography.

Figure 29:
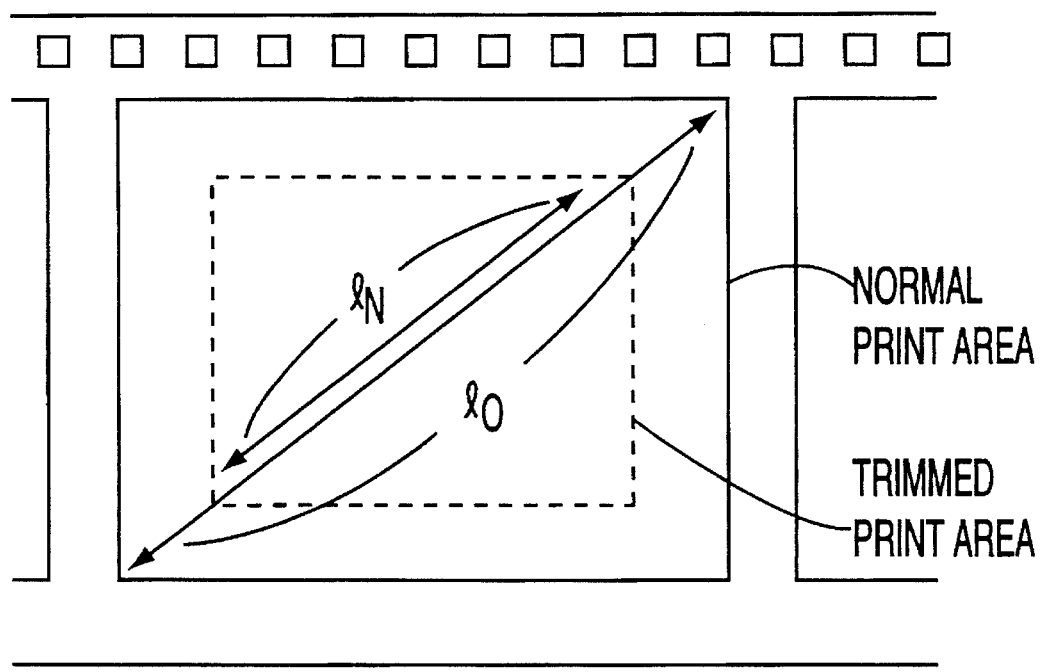
FIG. 29 is an illustration for explaining the printing area corresponding to the trimming data.
Figure 30A:
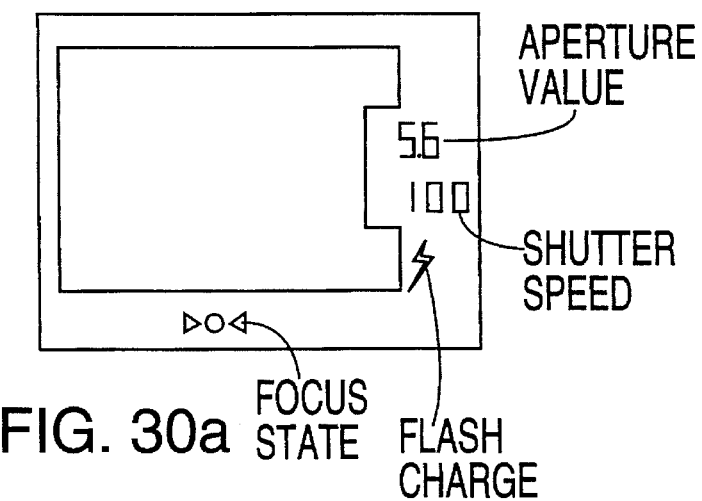
FIGS. 30(a) through 30(e) is an illustration showing sample indication in the view finder.
Figure 30B:
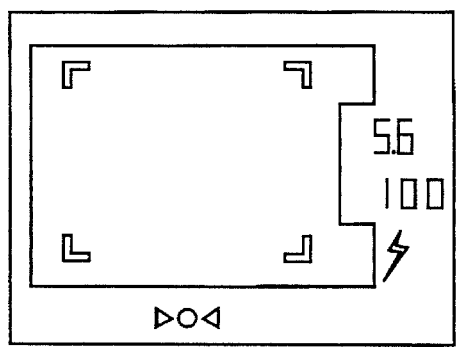
Figure 30C:
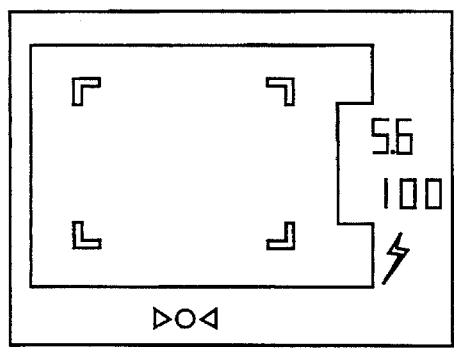
Figure 30D:
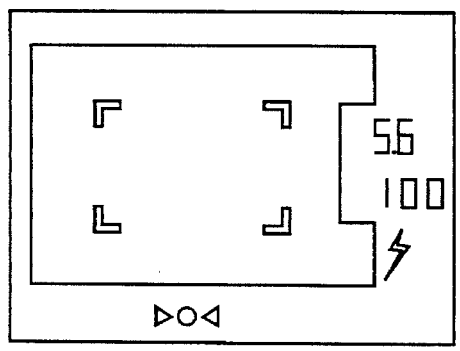
Figure 30E:
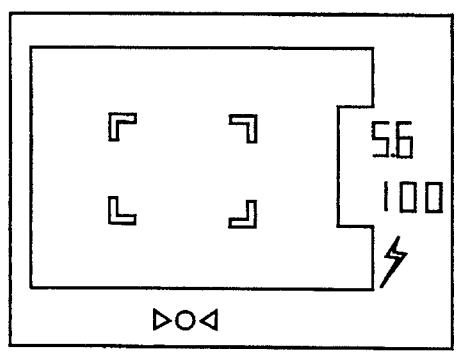

The trimming data and the actual printing area in the printing paper will be described below with reference to FIG. 29. If the trimming data is #0, then all of the exposed area within a frame is printed to the printing paper. If the diagonal of the frame is noted by LO, then the relationship between the diagonal of trimmed printing area Ln and LO is given as follows.

$$LO = Ln 2^{N/4}$$

Where N is a parameter which is set as trimming data. In this embodiment, N has the range 0–4. The amount of trimming is changed in accordance with the power series.

FIG. 30 is an indication example in the view finder of the camera. In FIGS. 30 (a)–(e), only the area surrounded by the four corner markers will be printed on the printing paper, each one of the figures corresponds to a different trimming magnification N, of 0–4, respectively. Another trimming indication which enables one to view the actual trimming area can also be obtained using zooming view finder optics. The operating sequence of the subroutine "initial winding" will be described below with reference to FIGS. 19–20. In this subroutine, the film 29 is pulled out from the film cassette 74, and the film is delivered to the take up spool 6, when the back cover module 7 is mounted thereto, the data stored in the magnetic recording portion are read out in response to the above mentioned operation, and preventing from double exposure by using the read out data. In step S301, the subroutine "battery check" is performed. A register PICO is cleared in step S302, where the PICO is used for counting the PI pulse signal applied to the input port PPI. In step S303, the motor for delivering film (M2) 62 is driven in the counter clockwise direction, so that the film 29 is delivered from the film cassette toward the take up spool 6. When delivering the film 29, the sprocket wheel 83 meshes with the perforation of the film 29. Rotation of the sprocket wheel 83 causes the pulse signal to the PPI from the PI 25.

In step S304, the signal in the PPI is checked, if the pulse signal from the PI 25 is detected, the PICO is incremented in step S305. In step S306, the PICO is judged whether it equals to the predetermined value PIX1, wherein the PIX1 represents the number of pulse required to reach the tip portion of the film to the take up spool 6. In case of no agreement obtained, step S304 is performed again in order to continue the operation. In step S306, if an agreement obtained, the film delivering motor (M2) 62 is braked in step S307, the supply of power to the motor (M2) is stopped in step S308, and the value of M flag is checked in step S309. If the M flag is set "1", it means that the back cover module 7 is mounted to the main body 3 of the camera, then the flow advances from step S309 to step S310, and the B mode communication is executed. As a result, the magnetic head 34 is abutted to the film 29, enabling the M microcomputer 26 to reproduce the data on the film. The operation of reproducing the data is executed simultaneously as the film 29 is wound to the take up spool 6. After these operations, command G is transmitted to the M microcomputer 26 in step S311, starting communication in the G mode. In step S312, the frame number (O) is transmitted to the M microcomputer 26. Then the M microcomputer 26 stores the reproduced data into the area for frame number zero of the EEPROM 46.

In step S313, the register PICO is cleared. In step S314, the D-A converter 11a is set to vO in order to fix the feeding speed of the film 29, wherein the value Vo is fixed as to be suitable for the take up spool 6 to catch the film 29. Then the motor (M1) 61 for winding the film is driven in the clockwise direction in step S315. In step S316, the pulse signal from the PI 25 is checked, if the pulse signal is detected, the register PICO is incremented simultaneously in step S317. Then in step S318, the register PICO is judged whether it equals to the predetermined value PIX2, wherein the PIX2 represents the initial amounts of the film 29 to be wound on the take up spool 6. In case no match is obtained, step S316 is performed again in order to continue the operation. In step S316, if match is obtained, the film feeding motor 61 (M1) is braked in step S319, and supply of power to the motor M1 is stopped in step S320. In step S321, the state of the M flag is checked. If the flag is reset "0", then step S322 is performed, and the film counter is set to "1". In step S323, the variable TRMCO which counts number of frame other than #0 is cleared, to the main routine is returned to. Where the value TRMC) is recorded on the film as one of the data for zero frame. If the M flag is set "1" in step S321, then the flow advances to step S325, and the G mode communication is terminated. In seep S326, the C mode communication is executed, and the M microcomputer 26 separates the magnetic head 34 from the film 29.

In step S327, the H mode communication is executed, the B microcomputer 11 receives the data stored in the area for frame zero of the EEPROM. The received data are checked whether or not existing data for exposed frame in step S328. If no such data is detected, it means that the film 29 has been loaded for the first time, thus no frame is exposed. In this case, step S329 is performed, and the variable FCO is set to "1". In step S330, the variable TRMCO is cleared "0". The register EXPX is set to "O" in step S331, then returns to the main routine (step S332), wherein the EXPX is also used in the subroutine "rewind". On the other hand, in step S328, if there are data for an exposed frame, then step S333 is performed, the number of the exposed frame is checked to determine whether it equals EXPn or not, wherein EXPn represents the number of available exposure frames of the film loaded in the camera. In case a match is obtained in step 333, then a warning is indicated in step S334. This warning indicates that no frame of this film is available for exposure. When an exposure operation is being carried out, then the film is being multiple exposed. However, the camera does not inhibit from doing so, to allow conscious double exposure. Therefore, the camera executes only a warning operation in this step.

In step S333, if the number of exposed frame does not match the EXPn, then the number of exposed frames is set to the variable EXPX in step S336. The variable FCO is set to "1" (step S337), and a maximum value is set to the D-A converter 11a for setting speed of feeding film 29 (step S338), wherein the maximum value is one which can be set to the D-A converter 11a. Thus the transistor Q1 for supplying power to the bridge circuit 35 consisted of transistors Q2–Q5 remaining in the ON state. The motor (M1) 61 is driven in the clockwise direction in seep S339, then the film 29 is wound to the take up spool 6. In step S340, the PICO is set to "O", and the pulse signal from the PI 25 is checked at the port PPI. If the pulse signal received, then step S342 is performed and the PICO is incremented.

In step S343, the PICO is checked whether or not it equals to PIW, wherein the PIW denotes the number of the pulse of PI 25 required to wind the film 29 as much as one frame. If the PICO does not agree with the PIW, then the flow returns to step S341, and if an agreement is obtained, then the flow advances to step S344, the film counter FCO being incremented. In step S345, the FCO is checked if it equals to the exposed frame plus one, if a match is obtained, the unexposed portion of the film 29 is prepared at the aperture opening 82. In step S346, the motor (M1) 61 is braked, and the supply of power to the motor (M1) 61 is stopped in step S347. On the contrary, in step S345, if the FC0 does not agree with exposed frame plus one, then the flow returns to step S340 in order to continue the film winding operation.

Figure 21:
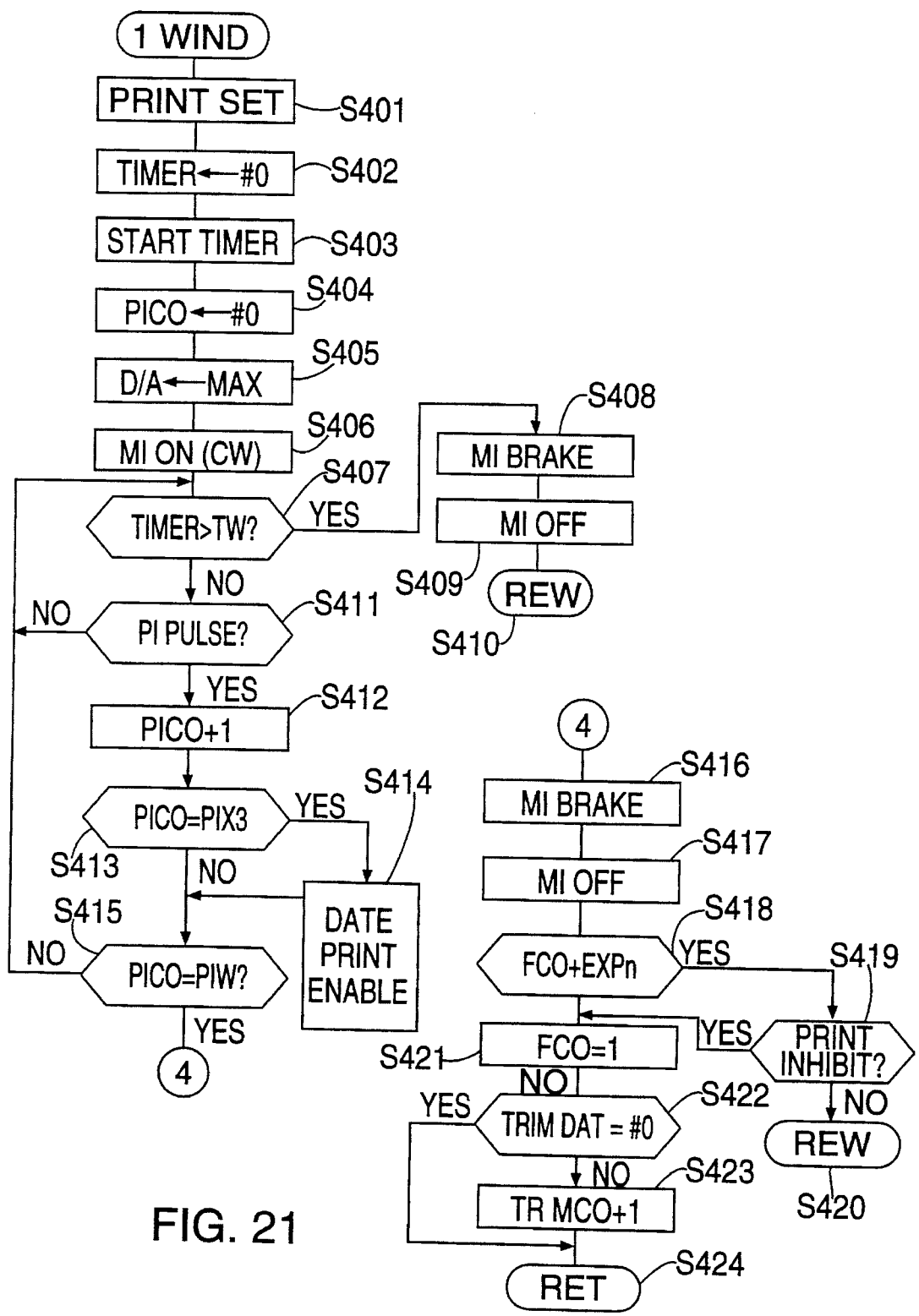

The operating sequence of the subroutine "one frame winding" will be described below with reference to the flow chart of FIG. 21. At first, the condition of date printing within the picture frame is set to the date control circuit, wherein the directed condition is a lapse of emitting time and an interval of emission of the B printing LED 31. The lapse of emitting time of the LED is set in accordance with the film speed, and the interval of emission of the LED is fixed in accordance with spacing between characters printed and the speed of feeding the film 29. In step S402, the timer counter is cleared, then counting is started in step S403. The timer counter is used for detecting the end of film 29. If the winding operation for one frame does not finish within a predetermined lapse of time Tw, then the film 29 is judged as winding up to the end. In step S404, the register PIC0 is cleared, and a maximum value is set to the D-A converter 11a for setting the speed of winding the film 29 in step S405, where the register PICO is used for counting the pulse signal from the signal processing circuit 24. In step S406, the motor (M1) 81 is driven in the clockwise direction, hence, the film 29 is wound by the take up spool 6.

In step S407, the value in the timer counter is checked to determine if it is greater than Tw. In the case where it is greater than Tw, the flow advances to step S408, and the motor (M1) 61 is braked. In step S409, the supply of power to the motor (M1) 61 is stopped and the flow advances to the subroutine "rewind". On the contrary, in step S407, if the value in the timer counter is smaller than Tw, then step S411 is performed, and waiting for arrival of the pulse signal on PPI by the signal processing circuit 24 from the PI 25 in step S411. If no signal is received, then step S407 is performed, and if the signal received, step S412 is performed. In step S412, the PICO is incremented, judging if the PICO equals to the PIX3 in step S413, wherein the PIX3 is a parameter which directs position of date to be printed. If match is obtained, step S414 is performed, directing the date control circuit to start the printing operation. In the case of an inhibited printing mode, the date control circuit does not print the date despite receiving the command from the B microcomputer 11, because the B microcomputer 11 is operating without being in the data print mode enabled in step S414.

In step S415, the PICO is checked to determine if it equals PIW, wherein PIW denotes the number of pulse signals generated by the PI 25 when winding the film 29 as much as one frame. If the PICO does not agree with the PIW, the flow returns to step S407 in order to continue the operation. When the film 29 is wound as much as one frame, the motor (M1) 61 is braked in step S416, and the supply of power to the motor (M1) is stopped in step S417. In step S418, the value of the film counter FCO is checked to determine if it equals EXPn, wherein EXPn denotes the number of the exposure frame available of the film 29, which is read out from the DX code read out circuit 20. If the FCO does not agree with the EXPn, then the FCO is incremented in step S421. In step S419, the print inhibited mode is examined, if being in the print inhibited mode, step S421 is performed, and if not being in that mode, the flow advances to the subroutine "rewind". This is the reason for the fact that the operation of date printing within the picture frame is done in response to winding film in this embodiment, so that imperfection of winding film causes imperfection of printing date, i.e., generally, a 24 EXP film is allowed to expose up to 25 frames, however, exposing further frame is not guaranteed. Thus steps S418, and S419 are added. In step S422, the trimming data is checked if it equals to #0, if a match is obtained, the flow returns to the main routine, else the TRMCO is incremented in step S423.

Figure 22:
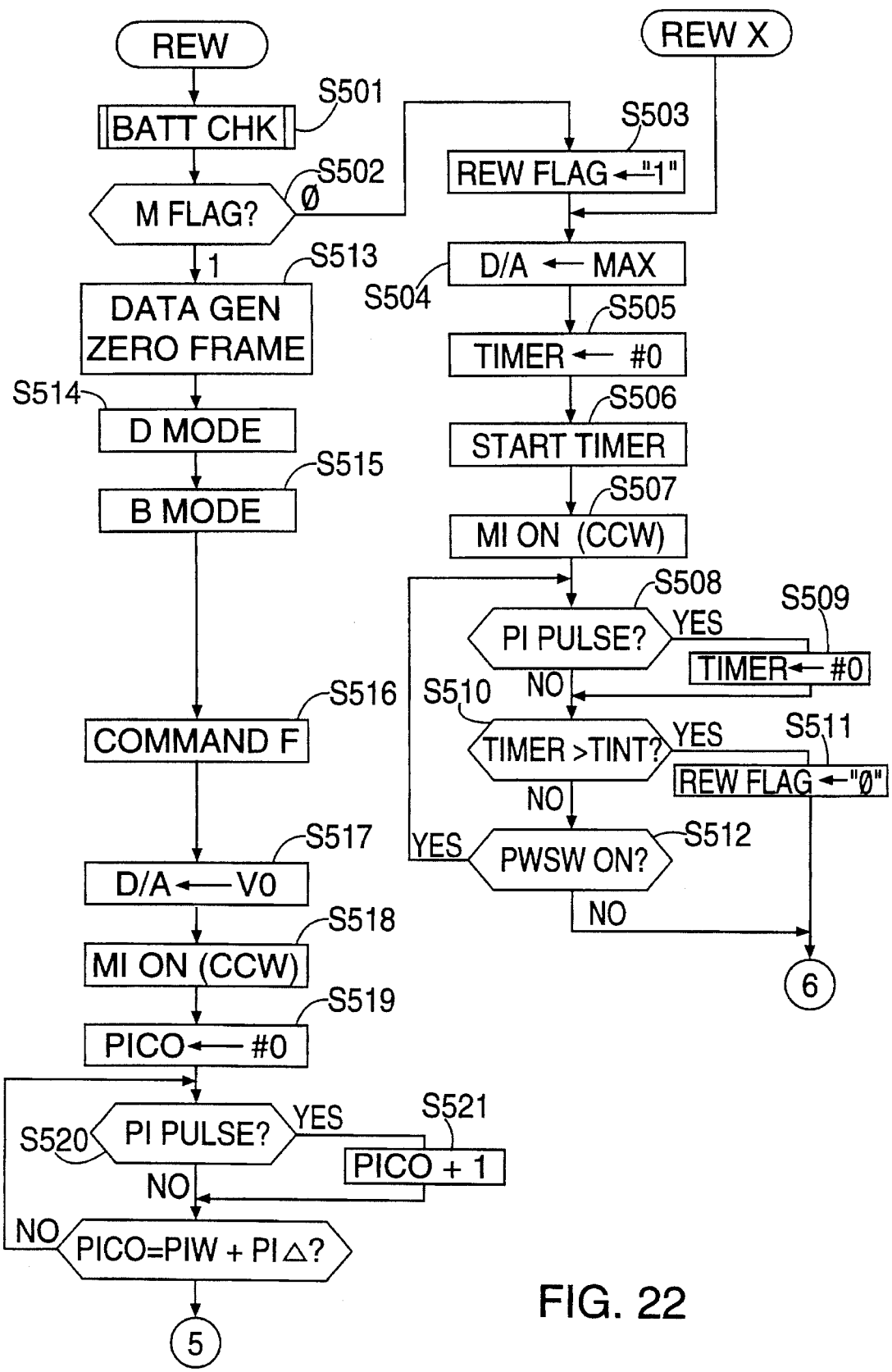
Figure 23:
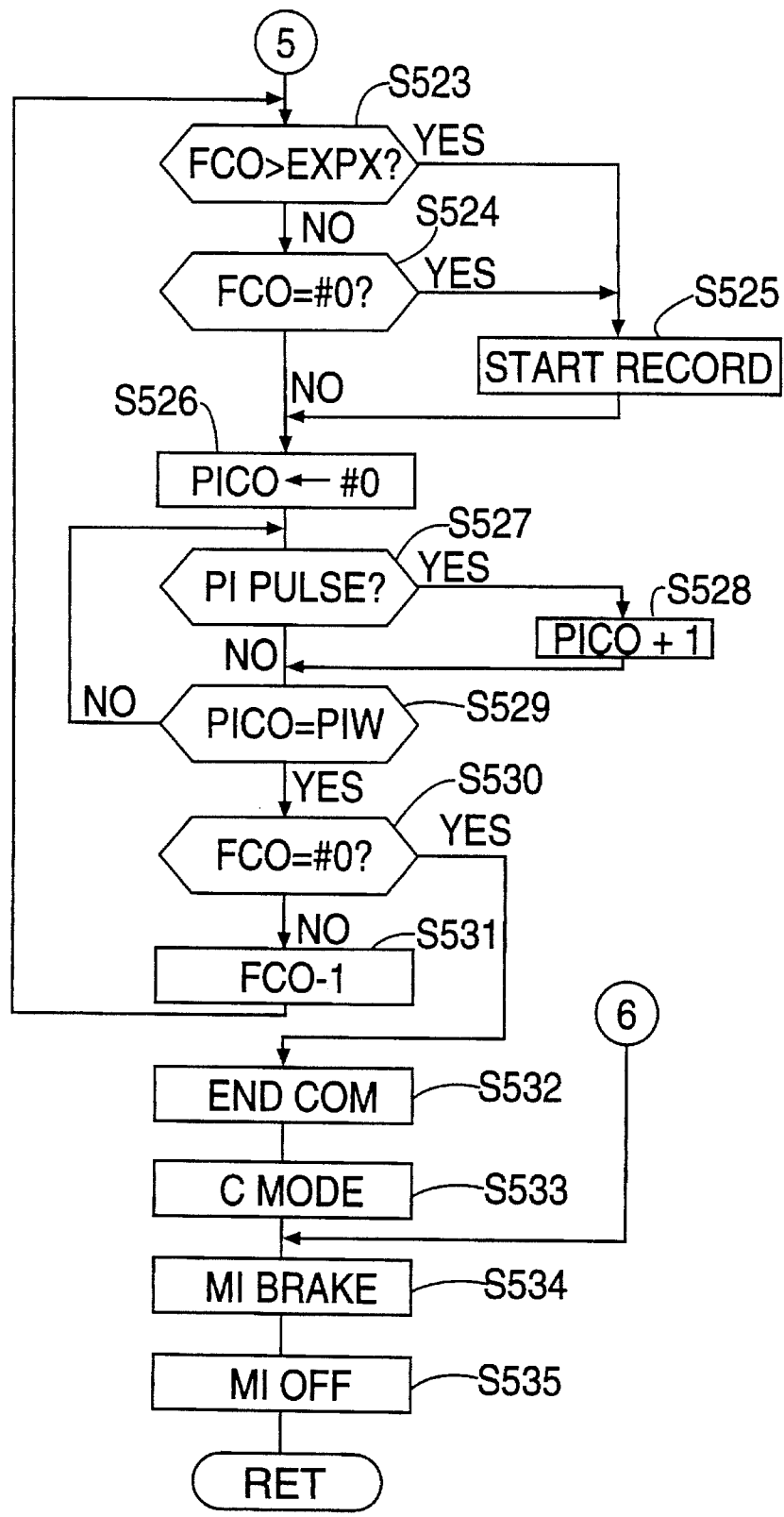

The operating sequence of the subroutine "rewind" will be described below with reference to the flow chart of FIGS. 22–23. At first, the subroutine "battery check" is performed in step S501. The condition of the M flag is checked in step S502. If the flag is reset "0", then step S503 is performed, and the rewind flag is set "1", which will be stored into the memory 18, because the flag should be kept even during the power off state. The rewind flag is cleared when the rewind operation is terminated normally. If the back cover mounted to the camera is other than the back cover module 7, then the film 29 is required simply to be rewound into the film cassette 74, so that it is preferable to rewind the film as fast as possible with allowing deviation in its speed. In such a case, a maximum value is set to the D-A converter 11a for fixing rewinding speed of the film 29 in step S504, clearing the timer counter (step S505), and starting the timer counter (step S506). The timer counter is used for judging if the rewinding operation is completely finished.

The film 29 is rewound into the film cassette 74 by driving the motor (M1) 61 in the counter clockwise direction in step S507. The input port PPI is checked if it receives the pulse signal in step S508, if the pulse signal received, then step S509 is performed, and the timer counter is cleared. In step S510, value in the timer counter is checked if it is greater than a predetermined value TINT. When the film 29 has been rewound into the film cassette 74, the sprocket wheel 83 has become stopped and thus generation of a pulse signal is also stopped. Then the flow advances from step S510 to step S511 because of the advance in the timer counter. In step S511, the rewind flag is cleared, and step S534 is performed in order to brake the motor (M1) 61.

In the case of advancing step from S510 to S512, the state of the power switch PW SW is checked. If the PW SW is ON, then the flow returns to step S508. When the PW SW being turned OPF, step S534 is performed in order to stop the rewinding operation, in such a case, as step S511 is not performed, the rewind flag is kept in the set condition "1". If returning to the main routine is caused by turning off of the PW SW, the B microcomputer 11 halts in its main routine. However, as the rewind flag is kept in the set condition, when beginning operation of the B microcomputer 11 again, the subroutine rewind X- is performed again, which corresponds to step S102 and S103 in the main routine (see FIG. 16). Thus, the remaining film 29 in the camera is then begun to rewind into the film cassette 74 again. Where the interruption of film rewinding can be allowed only in case of mounting to the camera other than the back cover module 7. The M microcomputer 26 records the data stored in the EEPROM 46 simultaneously in response to the rewind operation, so interruption in the rewind operation can not be allowed when mounting the back cover module 7 to the camera.

On the other hand, in step S502, if the back cover mounted to the camera is the back cover module 7, then step S513 is performed, and the data is prepared for storing in address ADOO–ADON of the EEPROM 46. In step S514, the D mode communication is executed, the data obtained in this communication are stored in the EEPROM 46, which are used for preventing from double exposure as described above. In step S515, the B mode communication is executed, in this communication, the M microcomputer 26 enables to flow current in the solenoid 45, resulting that the magnetic head 34 is abutted on the film 29. The operation of recording data is carried out simultaneously with the operation of rewinding the film 29. In step S516, the command F is transmitted to the M microcomputer 26 in order to begin the F mode communication. A value Vo is set to the D-A converter 11a for fixing speed of feeding the film 29 in step S517, wherein the value Vo denotes suitable speed of feeding the film 29 for recording data on the magnetic track 41. In step S518, the motor (M1) 61 is driven in the counter clockwise direction in order to rewind the film 29 into the film cassette 74. The register PICO is cleared in step S519, wherein the PICO is used for counting the pulse signal received in the input port PPI.

In step S520, wailing for the pulse signal from the PI 25, if the pulse signal is detected, then step S521 is performed, and the PIC0 is incremented. The PIC0 is checked if it equals to PIW+PI A in step S522. If an agreement is not obtained, then the flow returns to step S520 in order to continue the pulse count operation, and if an agreement is obtained, then step S523 is performed. A predetermined amount of time delay to from the beginning of film feeding to the beginning of recording operation is generated by the operation of steps S520–S522.

Figure 31:
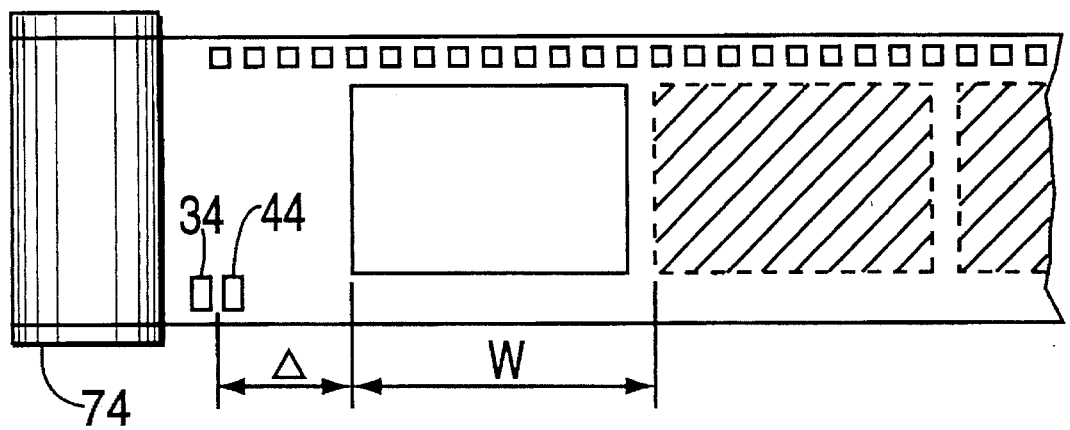
FIGS. 31–33 are illustrations showing operation of recording data into the magnetic material of the film 29 by the M microcomputer 26.

The reason why steps S520–S522 are required will be described below with reference to FIG. 31. Provided that the magnetic head 34 and the M printing LED 44 are disposed with offset spacing Δ in the section from the aperture opening 82 to the film cassette 74, the PI Δ is a value converted the offset spacing Δ into the number of pulse signals. W is an amount of film movement as much as one frame, and the PIW is a value converted W into the number of pulse signals. The M microcomputer 26 executes two recording operations in response to the operation of rewinding the film 29. The one is the operation of recording the data on the magnetic track of the film 29 by using the magnetic head 34, and the other is the operation of printing the data optically to the area below the exposed portion of the film in the opposite side of the perforation by using the M printing LED 44. Thus, recording data within the section shown as Δ+W can not be executed by the above described operation of steps S520–S522. These operations (steps S520–S522) enable the recording position to meet with the exposed area of the film. If misalignment occurred, this causes some trouble both in printing treatment to the printing paper and in cutting of the film. The magnetic head 34 is, in fact, disposed at a different position than the M printing LED 44, thus to be exact two values of Δ are required. However, if the offset spacing is minimized as not to cause any trouble, then it gives no fatal obstacle to use only one Δ value. The value Δ is stored in the memory 18.

Now, the operation in the flow chart will be described again with reference to FIG. 23. In step S523, the FCO is judged if it is greater than the EXPX, wherein EXPX denotes the number of the exposed frame. If the FCO is greater than the EXPX, then the flow advances to step S525, and a start recording signal is transmitted to the M microcomputer 26. The B microcomputer 11 outputs the FCO as the start recording signal. If the FCO is smaller than the EXPX, then the FCO is inhibited from transmitting to the M microcomputer 26. The reason for this will be described below. The film 29, which is once used, has some data thereon from one frame to the frame indicated by the EXPX, so there are no further needs to record to that film 29. If the recording operation is carried out, then undefined data remaining in the EEPROM 46 are recorded on the magnetic track of the film 29, and the optically printed data are difficult to be read out because of double exposure of the different data.

In step S523, if the FCO is smaller than the EXPX, then the flow advances to step S524, and the FCO is checked if it equals "0". If it equals "0", then step S525 is performed, and the FCO is transmitted to the M micrompleter 26. Number of the exposed frame is required to record on the zero frame track of the film, when there are some data on the film, recording operation is executed to change the data. In step S526, the PICO is cleared, and in step S527, waiting for the pulse signal from the PI 25.

When detecting the pulse signal from the PI 25, step S528 is performed, and the PICO is incremented. In step S529, the PICO is checked to determine if it equals PIW. While the film 29 is rewound as much as one frame, the operation of steps S527–S529 is continued. After rewinding the film 29 as much as one frame, the flow advances to step S530. In step S530, the film counter FCO is checked to determine if it equals "0". If a match is obtained, step S532 is performed, and the F mode communication is terminated. In step S533, the C mode communication is executed, and the M microcomputer 26 stops supplying current to the solenoid 45. Thus, the magnetic head 34 is separated from the film 29. The motor (M1) 61 is braked (step S534), the supply of power to the motor (M1) 61 (step S535) is stopped, and the process flow returns to the main routine. In step S530, if the FCO is not "0", then step 8531 is performed. After decrementing the FCO, the flow returns to step S523 to continue the rewind operation.

Figure 24:
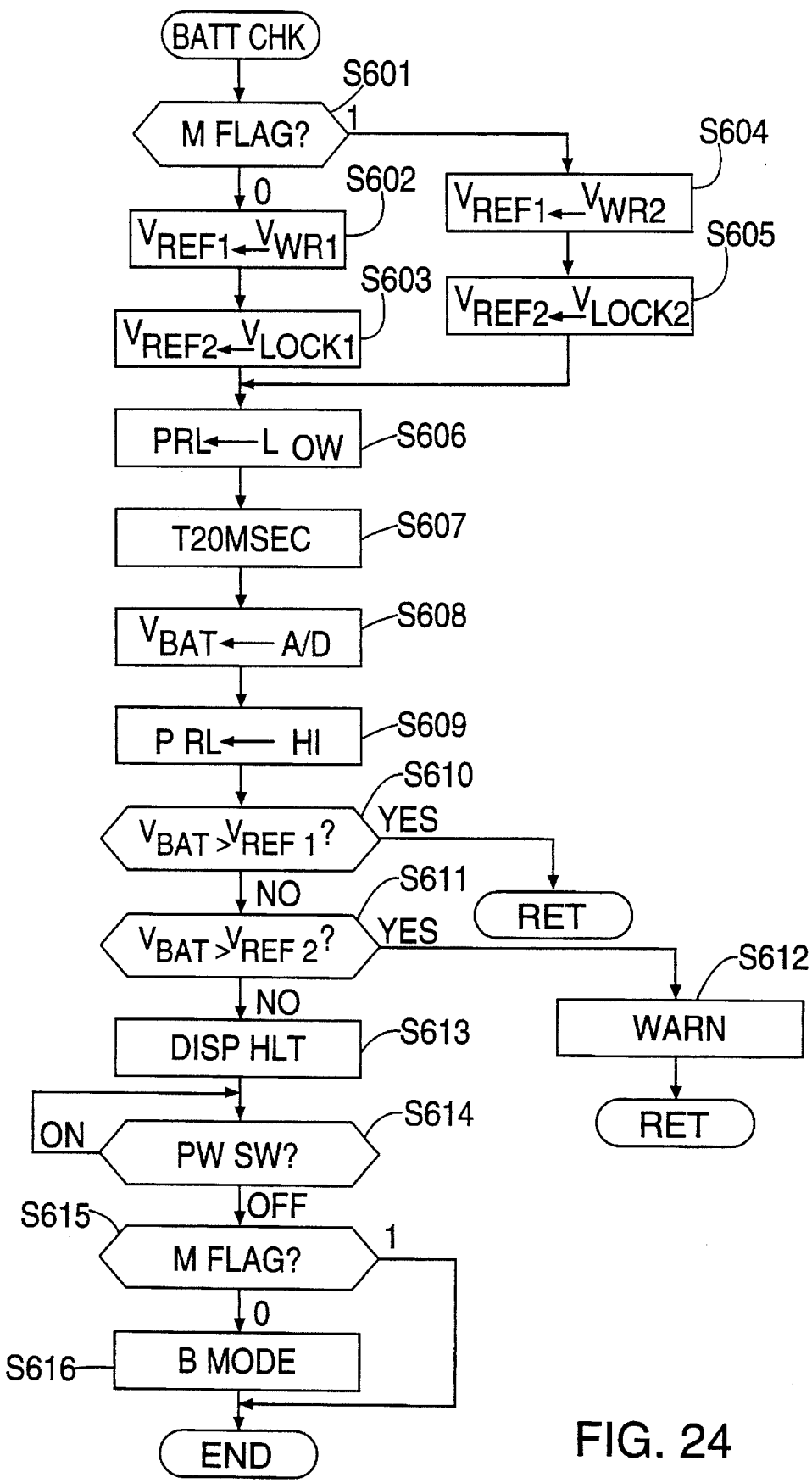

The operating sequence of the subroutine "battery check" will be described below with reference to the flow chart of FIG. 24. The state of the M flag is checked in step S601. If it equals "O", then step S602 is performed, else step S604 is performed. In step S602, the VWR1 is read out from the memory 18, which is connected to the B microcomputer 11, and stored in the register VREF1.

In step S603, the VLOCK1 is read out from the memory 18, and stored in the register VREF2, and the state of the battery is judged on the basis of the result of the two reference voltages stored in the VREF1 and VREF2. If the VRF1 is greater than the VREF2 and the voltage of the battery is greater than the VREF1, then the operation of the camera will be carried out with no trouble. If the VRF1 equals to or is greater than the voltage of the battery, which is equal to or greater than the VREF2, then warning should be given to the operator because it will give no trouble in the operation of the camera, but a great deal of the energizing power of the battery has been lost. Further, if the VRF2 is equal to, or greater than, the voltage of the battery, then the operation of the camera should be inhibited because the battery has insufficient energizing power to guarantee the operation of the camera.

The VR1 is a value to be used for judging whether or not giving the warning to the operator when the back cover module 7 is not mounted to the camera. When the back cover module 7 is mounted to the camera, the same reference voltage can not be used because of greater battery loading. Therefore, in step S604, the VWR2 is set as the VRF1 in order to meet the condition that the VWR2 is greater than the VWR1, wherein the VWR2 is stored in the memory 18. The VLOCK1 is a value to be used for judging whether or not to permit the operation of the camera. When the back cover module 7 is mounted to the camera, the VLOCK1 can not be used, so in step S605, the VLOCK2 is set as the VREF2. In this case the VLOCK2 is greater than the VLOCK1, wherein the VLOCK2 is stored in the memory 18. When the reference voltages are both set to the VREF1 and the VREF2, step S606 is performed.

In step S606, the output port PRL is changed from high level "H" to low level "L" in order to turn on the transistor Q10 which allows current to flow into the load resistor RL. A 20 msec delay is executed in order to get stability in the voltage of the battery in step S607. In step S608, the voltage of the battery is measured by the A-D converter 11*b* stored in the register VBAT. When finishing measurement of the voltage of the battery, in step S609, the PRL is changed from low level "L" to high level "H" turning off the transistor Q10. In step S610, the VBAT is checked to determine whether or not it is greater than the VREF1. If the VBAT is greater than the VREF1, then no trouble will occur, so the flow returns to the main routine.

If the VBAT is smaller than the VREF1, then the VBAT is further checked to determine whether or not it is greater than the VREF2 in step S611. If the VBAT is greater than the VREF2, then step S612 is performed, and the flow returns to the main routine after giving some warning. In step S611, if the VBAT is smaller than the VREF2, then step S613 is performed, making indication of an inhibited state of operation, and waiting for the power switch to be turned off by the operator in step S614.

When the power switch is turned off, step S615 is performed, and the M flag is examined. If the M flag is "O", then the B microcomputer 11 will halt its operation, else the B microcomputer 11 will halt its operation after executing the B mode communication in step S616.

The operation of recording data to the magnetic track of the film 29 by the M microcomputer 26 will be described below with reference to FIGS. 31–33, and 38. The operation of the M microcomputer 26 is described with reference to FIG. 38.

As is described above, the M microcomputer 26 is operated by the commands of the B microcomputer 11 (referring to FIGS. 9–14). In step S701, the M microcomputer 26 detects communication request commands from the B microcomputer 11 by sensing the state of the input port Pr9. When detecting the communication request command, the flow advances from step S701 to step S702. In step S702, the M microcomputer detects command A from the B microcomputer. In case of detecting command A, the flow advances from step S702 to step S703, and the predetermined process for terminating the communication is executed. Where the process in the A mode is to detect whether the back cover module 7 is mounted to the camera or not by the B microcomputer 11. The B microcomputer determines the existence of the back cover module 7 by confirming the A mode communication. Therefore, no additional process is required for the M microcomputer 26.

In the case of detecting a command other than command A, the flow advances from step S702 to step S704. If command B is detected, then the flow advances from step S704 to step S705, and the process of the B mode is executed. In step S705, the M microcomputer enables the flow of current into the solenoid to cause the magnetic head 34 and H printing LED 44 to abut the film 29, and step S703 is performed.

When the detected command is a command other than the command B, the flow advances from step S704 to step S706. If the detected command is command C, then the flow advances from step S706 to step S707, and the process of the C mode is executed.

In step S707, the M microcomputer disables the flow of current into the solenoid so as to separate the magnetic head 34 and M printing LED 44 from the film 29, step S703 being performed. When the detected command is other than command C, the flow advances from step S706 to step S708. If the detected command is command D, then the flow advances from step S708 to step S709, and the process of the D mode is executed.

In step S709, the M microcomputer receives data from the B microcomputer. The B microcomputer transmits data to the M microcomputer prior to exposure, wherein the data are recorded onto the film when the film is rewound. Therefore, in step S710, the M microcomputer transfers the received data into the EEPROM, and step S703 is performed.

When the detected command is other than command D, the flow advances from step S708 to step S711. If detected command is command E, then the flow advances from step S711 to step S712, and the process of the E mode is executed. In step S712, the M microcomputer receives data including the parameters for recording the data onto the film, and step S703 is performed.

When the detected command is other than command E, the flow advances from step 8711 to step S713. If the detected command is command F, then the flow advances from step S713 to step S714, and being executed the process of the F mode. In the F mode, the M microcomputer enables to record data from the EEPROM onto the film when the film is rewinding. In step S714, the M microcomputer stands by until frame number data is transmitted from the B microcomputer. When receiving the frame number data, the M microcomputer reads out corresponding data from the EEPROM, and records the data onto the film. The data recording utilizes both the magnetic head 34 and the M printing LED 44, so that the data are recorded by both the magnetic recording means and the optical recording means.

In step S716, the M microcomputer detects whether or not the current frame number is zero. When the detected frame number is zero, it corresponds to the completion of the recording of all the data, so that step S703 is performed. In case of detecting no zero, step S714 is performed in order to continue the recording operation. Where the operation of data recording will be described later.

When the detected command is other than command F, the flow advances from step S713 to step S717. If the detected command is command G, then the flow advances from step S717 to step S718, and the process of the G mode is executed. In step S718, the M microcomputer reproduces the magnetic data recorded on the film. In step S719, the M microcomputer stores the data into the EEPROM. The G mode is used for detecting unexposed frame when loading a film which is exposed halfway.

When a detected command is other than command G, the flow advances from step S717 to step S720. If the detected command is command H, then the flow advances from step S720 to step S721, and the process of the H mode is executed. In step S721, the M microcomputer receives current frame number data from the EEPROM. In step S722, the M microcomputer transmits the data to the B microcomputer, and step S703 is performed.

Figure 32:
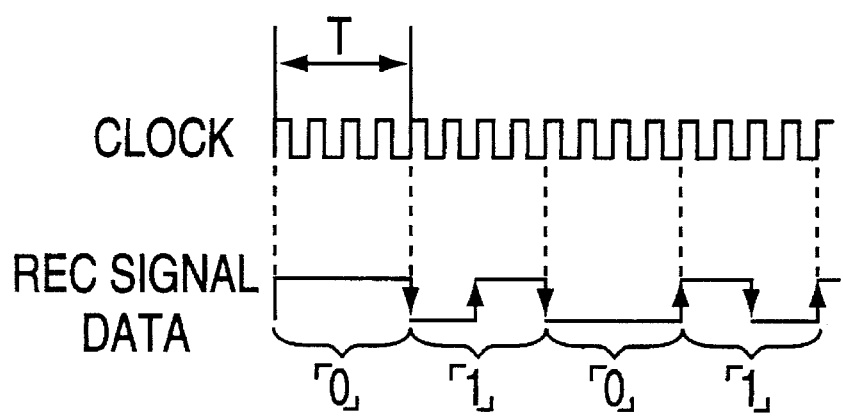

In FIG. 32, a toggle motion having period T is executed for every bit data "0", and another toggle motion having period half of T is executed for every bit data "1". That is, one frequency in the period T and the other frequency in the period half of T is denoted by bit data "0" and "1", respectively. The clock number for fixing the period T is one of the parameters transmitted by the B microcomputer 11 in the E mode.

Figure 33:
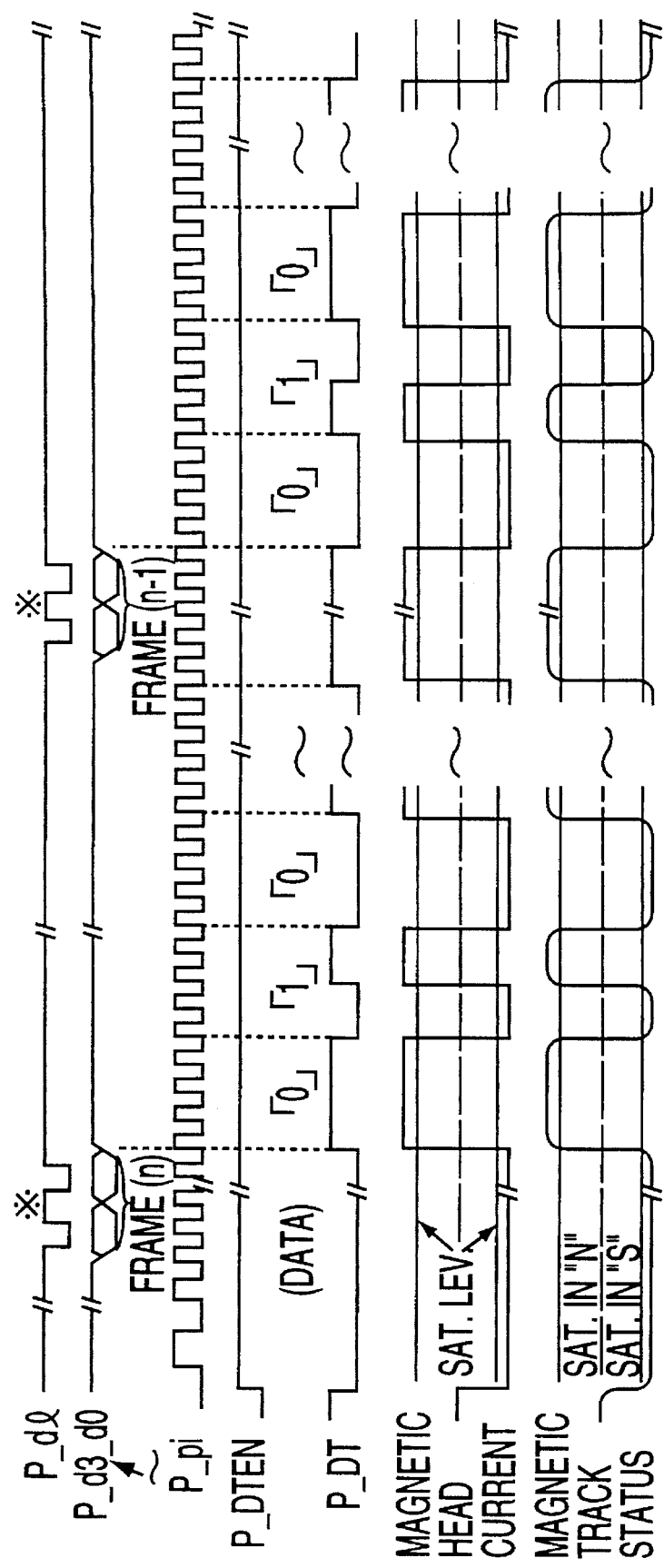

The pulse signal from the PI 25, which is supplied to the input port Ppi, is used as the clock signal. The value of this parameter is fixed so as to be suitable for the number of the data and the number of the pulse signal from the PI 25 for an unit length of the film 29. In FIG. 33, when the B microcomputer 11 begins to rewind the film 29, then the pulse signal is received in the input port Ppi. If the M microcomputer 26 sets its output port PDTEN from low level "L" to high level "H". Magnetizing current can be passed through the magnetic head 34. Sufficient current is passed through the magnetic head 34 to saturate the magnetic substance of the film in response to the output port PDT. The logic level "H" corresponds to N or S saturation level, and the logic level "L" corresponds to S or N saturation level of the magnetization, respectively. The portions on the signal lines Pd3–PdO and Pdl directed by the asterisk (,) are the record start signals.

The M microcomputer 26 receives the current frame number as a record start signal, and reads out the data from corresponding area of the EEPROM 46, wherein the data are read out from the PDT in the described manner. When missing data transmission due to accomplish the continuous exposure, no such data is stored in the corresponding area of the EEPROM, and the M microcomputer 11 disables to record data onto such frames.

Figure 34A:
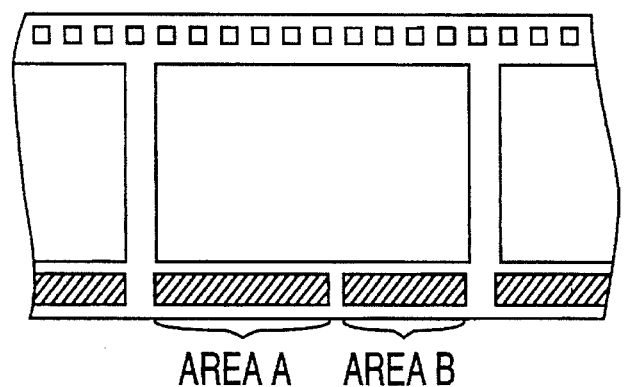
FIGS. 34(a) through 34(c) is an illustration showing operation of the M microcomputer 26 recording data optically into the film 29 by using M printing LED.
Figure 34B:
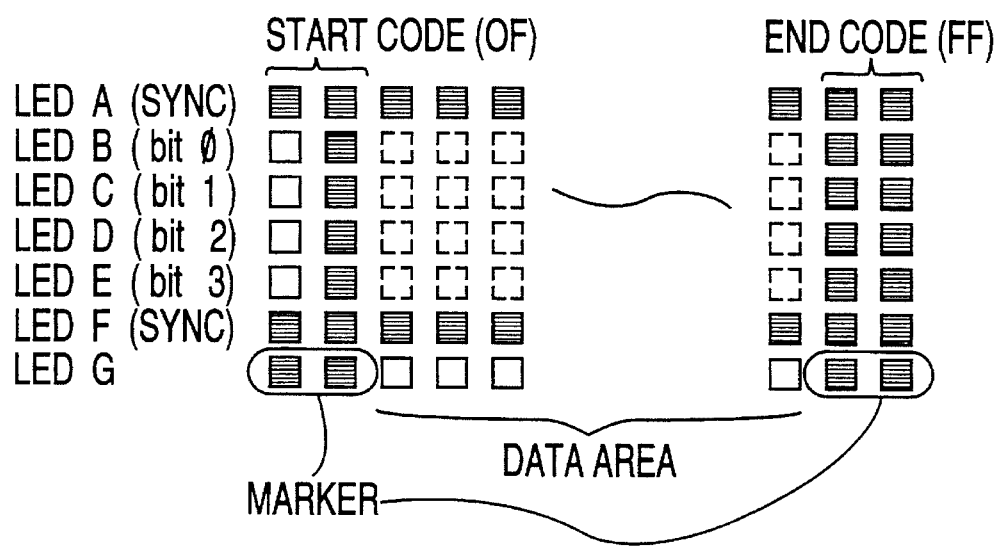
Figure 34C:
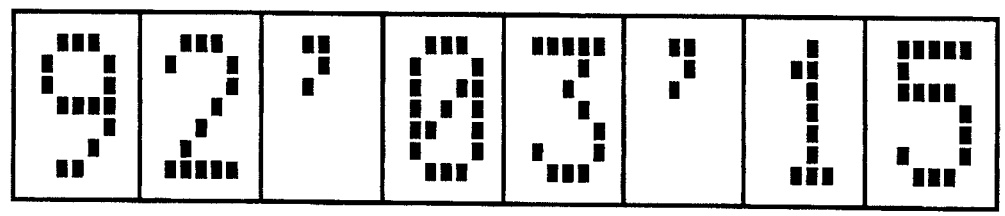

The operation of the optical data recording achieved by using the M printing LED will be described below with reference to FIG. 34 (b). The M printing LED 44 comprises a series of LEDs of A–G, which are blinked to print data in accordance with the feeding of the film 29. Assume for this embodiment that filled squares correspond to a "1" of data, and blanc squares to a "0" of data. Both LEDA and LEDF are used for printing the sync patterns. The four patterns between these two sync patterns are used to indicate a set of four bits of data, i.e., LEDB-LEDE correspond to bits 0–3, respectively. The data areas are separated by the stark code and end code, wherein these codes are added for reading out convenience. The LEDG is used for defining the start code and the end code. In this embodiment, the start code corresponds to the data "OF", and the end code to the data "FF", respectively. In FIG. 34 (a), two data recording areas (area A, area B) for recording data by the M printing LED 44 are provided below the exposure frame of the film. Code patterns for making prints are printed in the area A, The filled squares correspond to light emission of the LEDs, and the blanc squares to no light emission of the LEDs. The squares shown in the broken line are fixed whether or not to emit light on the basis of data to be recorded. In FIG. 34 (c), some data among recorded data in the area A are recorded in the visual form in the area B. In this embodiment, the photographing date data is printed by using the M printing LED 44, showing "MAR. 15, "92." The date printing is also available within the picture frame by using the B printing LED 31 in the main body 3 of the camera. Even though date printing mode may be inhibited within the picture frame, if the date data is given in area B, it is convenient to deal with the film. In this embodiment, the date is recorded only in the area B, however, as much other data as possible should also be recorded within area B.

Figure 35:
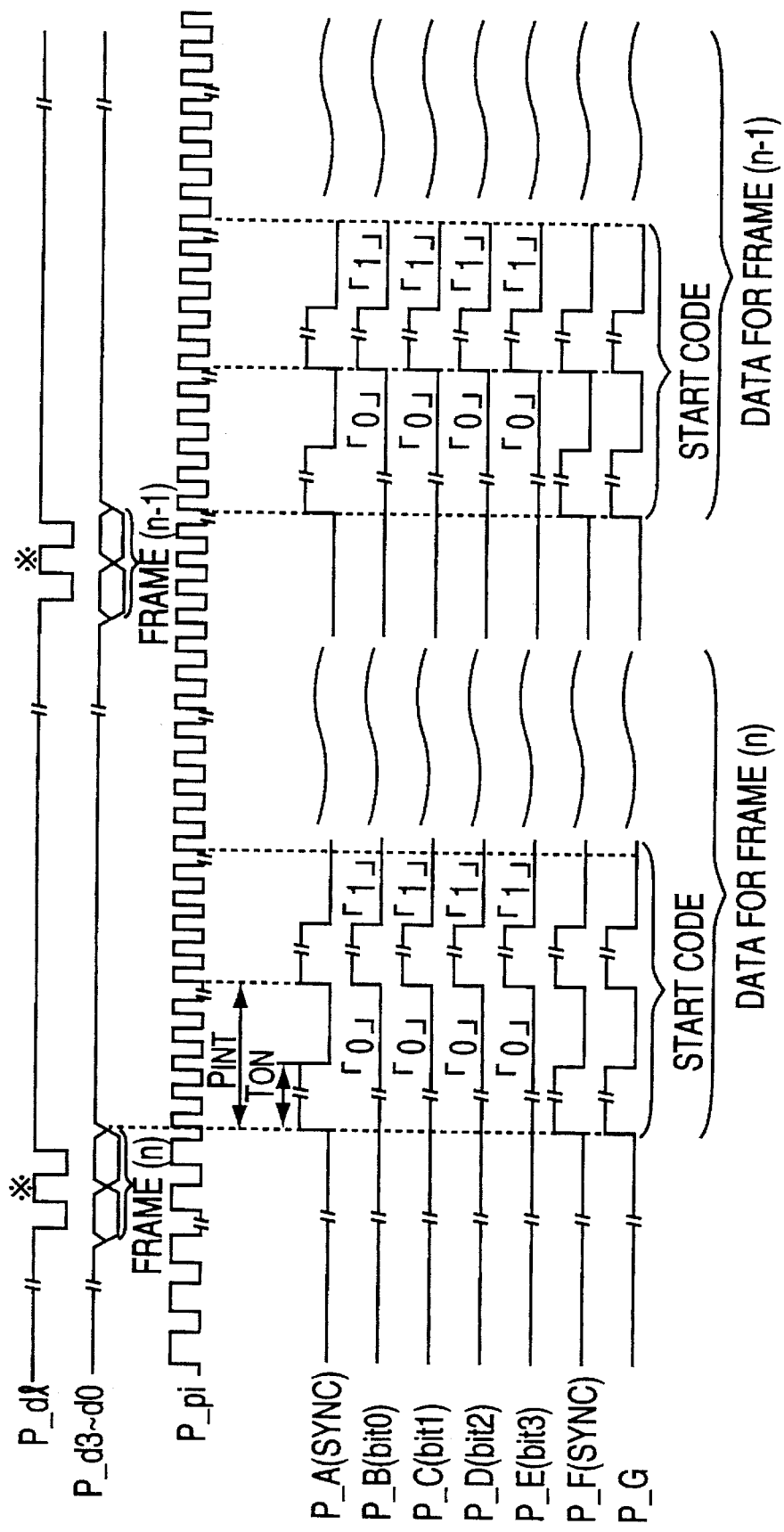
FIG. 35 is a time chart showing operation of the M microcomputer 26 recording data optically into the film 29 by using M printing LED.

FIG. 35 is a time chart showing the operation of optical data recording to the film 29 by using the M printing LED 44. When the B microcomputer 11 begins to rewind the film 29, the pulse signal from the PI 25 is received in the input port Ppi. The portions on the signal lines Pd3-PdO directed by the asterisk (*) are the record start signals from the B microcomputer 11. The M microcomputer 26 receives current frame number as a record start signal, and the data stored in the corresponding area of the EEPROM 46 are read out. This data is recorded both in the area A and area B by controlling PA-PG on the basis of the data. The lapse of emission (TON) and the interval of emission (PINT) of the M printing LED in the area A are included in the parameters output by the B microcomputer during E mode communication, wherein the parameters are fixed so as to be suitable for both the moving speed of film and the film speed. The parameters required for the recording operation in the area B are also transmitted from the B microcomputer 11.

Figure 36A:
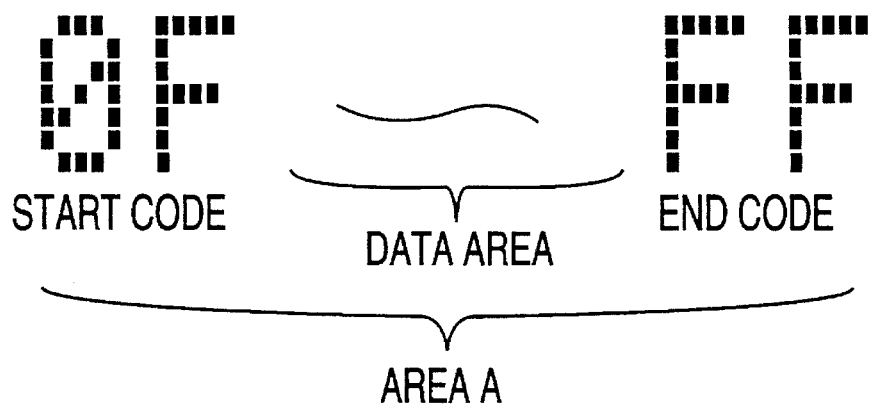
FIGS. 36(a) and (b) are recording form examples different from that of in FIG. 34.
Figure 36B:
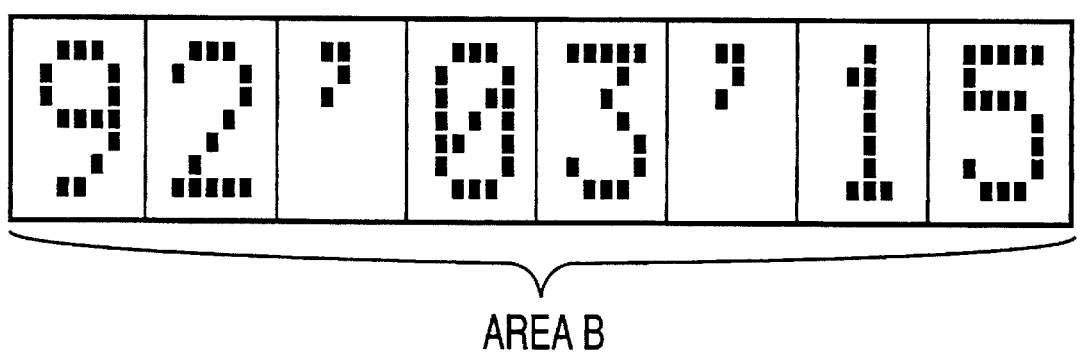
Figure 38:
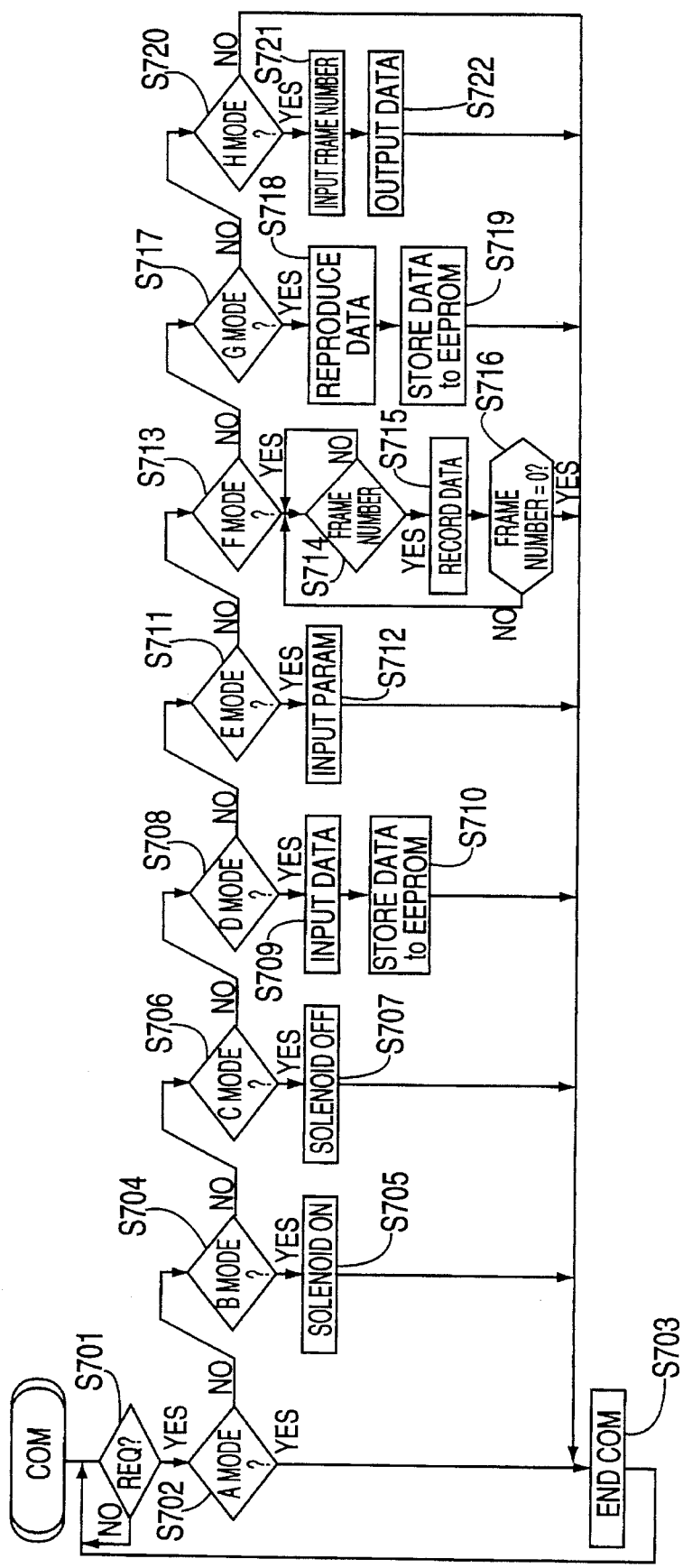
FIG. 38 is a flow chart showing operation of microcomputer 26.

In FIGS. 36 (a)–(b), illustrations of recording that differ from those of in FIG. 34 are shown. The data in area A are configured in units of four bits in this embodiment, so they can be denoted using hexadecimal codes (such as data O-F), and so that they can also be printed in the form of hexadecimal codes.

FIG. 37 shows data printed in area A, wherein the data are configured in the four bit units, which are stored in the EEPROM 46. As an example, "1992 (Year)", "March (month)", "15th (day)", "23 (hour)", and "55 (minute)" are stored. Bit 3 of the print mode data is used to indicate if the date should be printed on the rear face of the printing paper by the processing laboratory. If it equals "1", then printing is enabled, otherwise printing is disabled.

Bit 2 of the print mode data is indicating if the date should be printed on the surface of the printing paper by the processing laboratory. If bit 2 equals "1", then printing is enabled, otherwise printing is disabled. The format for printing the date is fixed by the combination of bit 3 and bit 2 of the print mode data. These two bits are fixed in response to the operation of the PSEL SW as shown in FIG. 28. Bit 1 and bit O are concern the selection of date print mode and are fixed in response to the operation of the DATA MOD SW as shown in FIG. 26. The binary data corresponding to bits 0–4 are stored as the trimming data, wherein the trimming data are fixed in response to the operation of the TRIM SW. The number of current frame is stored as "15 EXP" for example.

As mentioned above, according to this embodiment., by using both the optical recording method and the magnetic recording method, the drawbacks associated with each recording method can be compensated for with the other recording method. Thus, important data can be recorded using both these two methods.

In addition to the above described embodiment, an optical recording system is disclosed as to provide no data failure. Such a recording method is not limited only to optical recording as an alternative or in addition to optical recording the recording system may produce an irregular portion on the film by heating of a thermal head, or piercing of the film by a piercing device. In the above described embodiment, a magnetic recording caused by current flowing through the magnetic head is disclosed as the magnetic recording means, however, another magnetic recording methods are also available. For example, it is possible to reverse the magnetic polarity of the magnetic substance by heating the substance using a LASER or a thermal head.

Many modifications may be made to the above described system without departing from the spirit and scope of the invention, which is defined in the appended claims.

We claim:

1. An apparatus for recording camera information, comprising:
   (a) a main body of a camera;
   (b) first signal generating means provided in the main body of said camera for generating information in the form of data which is to be recorded;
   (c) first and second back covers selectively mounted onto a rear side of a film loaded in said camera, said second back cover including:
      i. second signal generating means for generating information in the form of data which is to be recorded;
      ii. memory means for storing data generated by said first signal generating means and said second signal generating means, said data including first data that requires a high degree of protection from data loss or is likely to change prior to development of said film and second data that requires a low degree of protection from data loss or that is unlikely to change prior to development of said film;
      iii. first optical printing means for optically printing said data generated by said first and second signal means onto said film;
      iv. magnetic recording means for recording said data generated by said first and second signal generating means onto a magnetic recording portion of said film; and
      v. control means for controlling the recording of said first and said second data to said film, by controlling the printing means and magnetic recording means to record and print said first data to said film and to record said second data to said film using only said magnetic head recording means;
   (d) discriminating means provided in said main body of said camera for determining which one of the first and second back covers is mounted to said camera; and
   (e) transferring means for transferring data information from said first signal generating means to said memory means only when said discriminating means determines that said second back cover is mounted to said camera.

2. The apparatus of claim 1, further comprising:
   second optical printing means provided in said main body of said camera for printing the date of photographing to the film on the basis of date data.

3. An apparatus, for recording camera information on a film having a magnetic recording track, capable of recording data to the film using optical data recording and magnetic data recording, the apparatus comprising:
   (a) memory means for sequentially storing photographing data, the photographing data corresponding to each photograph being stored in the order the photographs are taken;
   (b) control means for reading out data stored in said memory means in response to rewinding of said film and for outputting read out data to recording means while checking to determine whether or not said read out data is permitted to change after the taking of a photograph;
   (c) magnetic recording means for magnetically recording all the stored data read out from said memory means to said film; and
   (d) optical recording means for encoding permanent data read out from said memory means after a photograph is taken and for optically recording said encoded data on said film.

4. Apparatus according to claim 3, wherein said permanent data, includes data selected from the group consisting of photographing date data, print mode data for defining a print format of said date data, data identifying the direction of the trimming area to be used when in printing, and current frame number data.

* * * * *